(12) United States Patent
Okuma

(10) Patent No.: US 10,500,733 B2
(45) Date of Patent: Dec. 10, 2019

(54) DISPLACEMENT DETECTING APPARATUS, TORQUE DETECTING APPARATUS, ROBOT APPARATUS AND DISPLACEMENT DETECTING METHOD

(71) Applicant: CANON KABUSHIKI KAISHA, Tokyo (JP)

(72) Inventor: Isamu Okuma, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 93 days.

(21) Appl. No.: 15/546,250

(22) PCT Filed: Mar. 23, 2016

(86) PCT No.: PCT/JP2016/060286
§ 371 (c)(1),
(2) Date: Jul. 25, 2017

(87) PCT Pub. No.: WO2016/163280
PCT Pub. Date: Oct. 13, 2016

(65) Prior Publication Data
US 2018/0021957 A1    Jan. 25, 2018

(30) Foreign Application Priority Data

Apr. 6, 2015 (JP) ............................... 2015-077474
Feb. 8, 2016 (JP) ............................... 2016-021793

(51) Int. Cl.
*G05B 15/00* (2006.01)
*G05B 19/00* (2006.01)
(Continued)

(52) U.S. Cl.
CPC .......... *B25J 13/085* (2013.01); *G01D 5/3473* (2013.01); *G01L 3/12* (2013.01);
(Continued)

(58) Field of Classification Search
CPC ........ B25J 13/085; G01D 5/3473; G01L 3/12; G01L 3/1421; G01L 5/226; Y10S 901/46
See application file for complete search history.

(56) References Cited

U.S. PATENT DOCUMENTS 6,389,910 B1 * 5/2002 Eisenhauer ............... G01L 3/12
73/862.193
2010/0312394 A1 * 12/2010 Arimitsu .................. G01L 5/166
700/260
(Continued)

FOREIGN PATENT DOCUMENTS

JP    2009-019876 A    1/2009
JP    2012-189516 A    10/2012

OTHER PUBLICATIONS

PCT International Search Report and Written Opinion of the International Searching Authority dated May 31, 2016 in PCT/JP2016/060286.
(Continued)

*Primary Examiner* — Harry Y Oh
(74) *Attorney, Agent, or Firm* — Venable LLP

(57) ABSTRACT

The displacement detecting apparatus acquires a quantity of a relative rotational displacement between a scale and a detecting head, based on a change of outputs of the light-receiving elements. The displacement detecting apparatus acquires the quantity of the relative rotational displacement between the scale and the detecting head, by combining a quantity of a rough relative rotational displacement between the scale and the detecting head, which has been acquired from an output of the total of light quantities that are output from each of the light-receiving elements in the detecting head, with a quantity of a fine relative rotational displacement between the scale and the detecting head, which has been acquired from an incremental displacement signal that
(Continued)

is output from each of the light-receiving elements in the detecting head.

16 Claims, 17 Drawing Sheets

(51) Int. Cl.
*B25J 13/08* (2006.01)
*G01L 3/14* (2006.01)
*G01L 5/22* (2006.01)
*G01D 5/347* (2006.01)
*G01L 3/12* (2006.01)

(52) U.S. Cl.
CPC ............ *G01L 3/1421* (2013.01); *G01L 5/226* (2013.01); *Y10S 901/46* (2013.01)

(56) References Cited

U.S. PATENT DOCUMENTS

| 2011/0193930 A1* | 8/2011 | Ogura | B41J 19/207 |
| | | | 347/224 |
| 2014/0360804 A1* | 12/2014 | Oguchi | G01D 5/3473 |
| | | | 180/446 |
| 2017/0106655 A1* | 4/2017 | Moriwaki | B41J 2/0451 |

OTHER PUBLICATIONS

International International Preliminary Report on Patentability dated Oct. 19, 2017 in PCT/JP2016/060286.

* cited by examiner

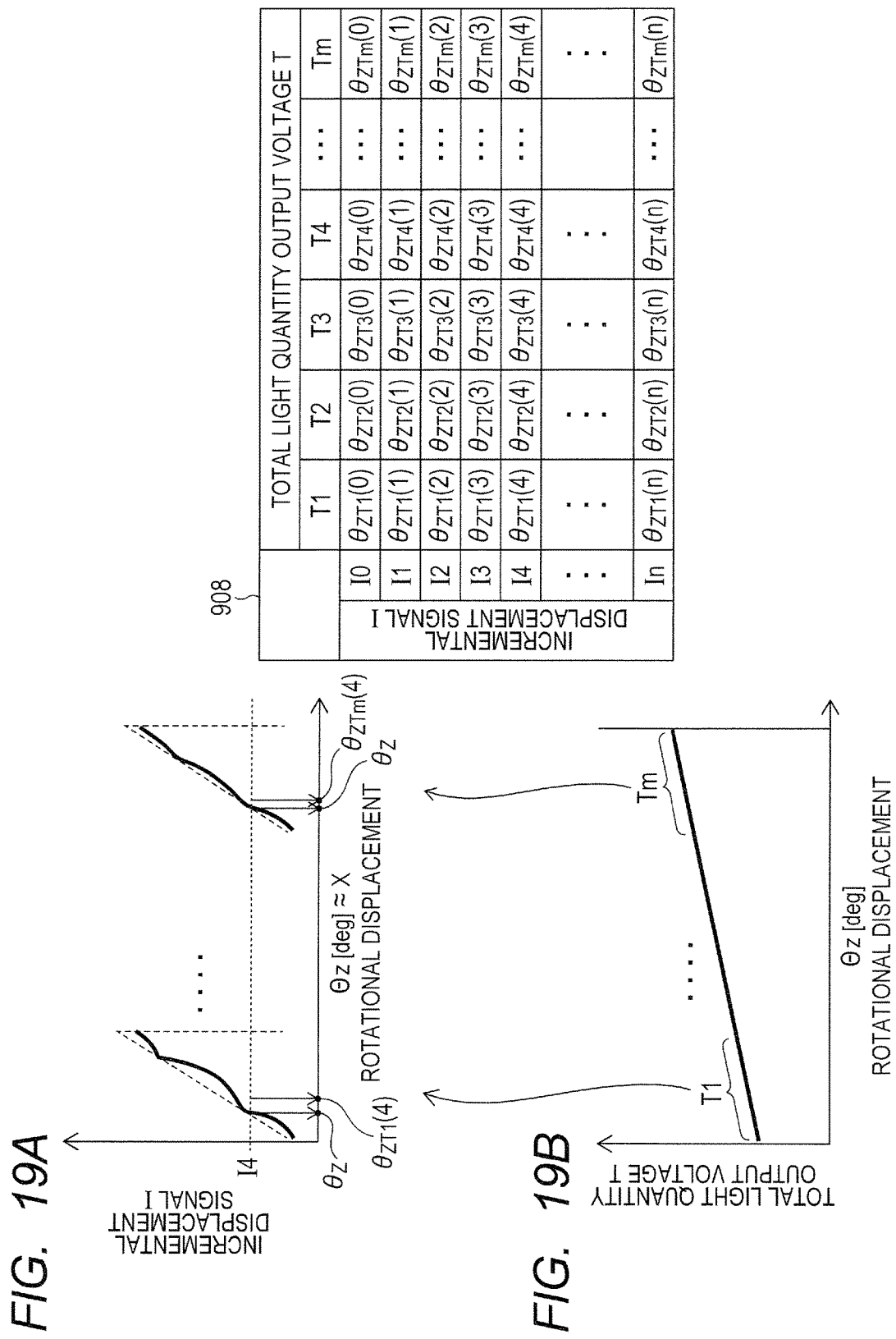

FIG. 20A
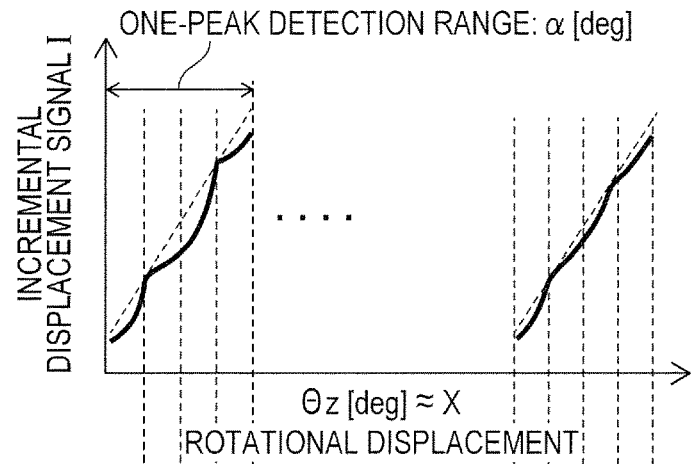
FIG. 20B
FIG. 20C
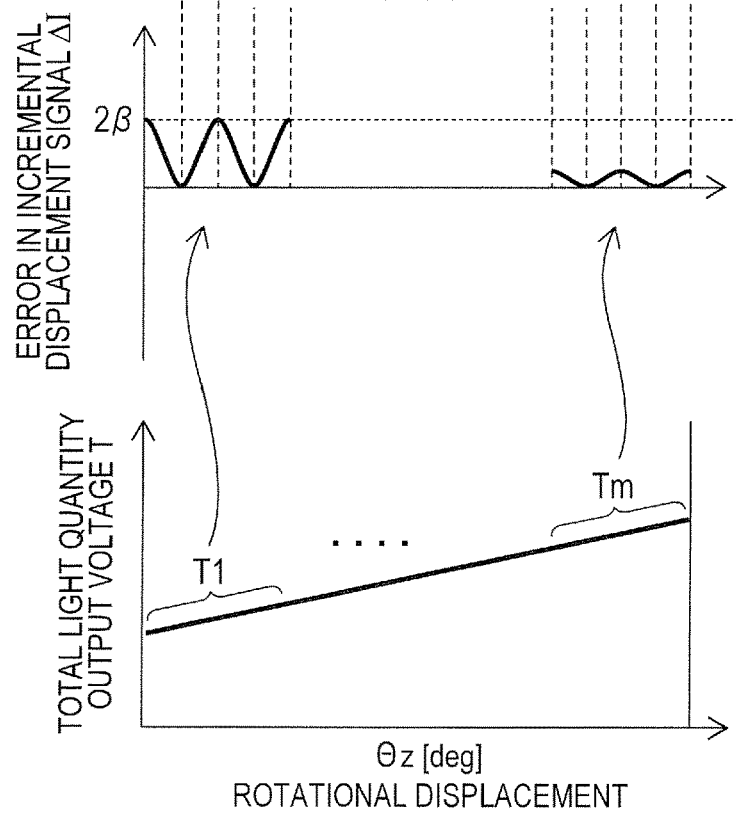
FIG. 21
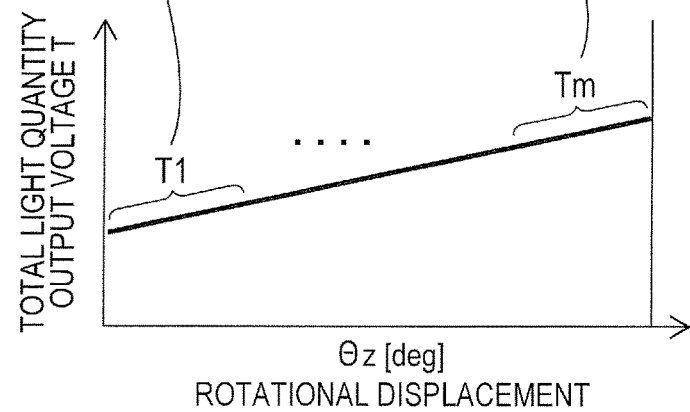

DISPLACEMENT DETECTING APPARATUS, TORQUE DETECTING APPARATUS, ROBOT APPARATUS AND DISPLACEMENT DETECTING METHOD

TECHNICAL FIELD

The present invention relates to a displacement detecting apparatus which acquires a relative displacement quantity between a scale having an optical pattern and a detecting head that detects the optical pattern of the scale; a torque detecting apparatus using the displacement detecting apparatus; a robot apparatus using the torque detecting apparatus; and a displacement detecting method.

BACKGROUND ART

In displacement detecting apparatuses, for instance, optical linear encoders, there is an apparatus that detects a fine displacement quantity as in a torque sensor and the like, which uses a deformation of an elastic body, in addition to an apparatus which detects a comparatively large displacement quantity of cm order, through a relative displacement quantity between a scale and a detecting head.

In such a type of torque sensor, any one of the scale and the detecting head is mounted on the elastic body, and the detecting head or the scale is mounted on a fixed member arranged in the vicinity of the elastic body so that the torque sensor can detect a torque which is applied to a disk and/or cylindrical elastic body, based on deformation of the elastic body in a rotational direction. Such a displacement detecting apparatus of the torque sensor has, for instance, a structure illustrated in FIGS. 3A and 3B of the following PTL 2. The displacement detecting apparatus in PTL 2 measures a fine deformation quantity of the elastic body, by an optical linear encoder which is provided on a circumference that is distant from the center of the rotation of the elastic body at a fixed distance.

In such a linear encoder, an optical pattern is provided in a scale, which has a lattice arrangement that is formed according to light and dark, a change of reflectivity, or the like. In addition, light-receiving elements of the lattice arrangement, which detect the optical pattern of the scale, are arranged in the detecting head. In addition, the torque sensor of this type, which uses the linear encoder, is occasionally used in order to detect a driving torque of a joint of a robot apparatus.

In this case, the torque sensor having the structure illustrated in PTL 2 detects the displacement quantity of an elastic body while regarding initial positions of the scale and the detecting head as starting points, and accordingly occasionally misses an absolute value of the displacement quantity (torque) due to a cause such as a crash. In such a case, it may become necessary to stop the operation of the robot apparatus, to disassemble the apparatus depending on the case, and to align the initial positions (zero point adjustment) in some cases. In order to eliminate this zero point adjustment and enable the apparatus to be operated without being stopped and disassembled even when the apparatus has caused the crash, the displacement detecting apparatus of the optical linear encoder type needs to be capable of detecting the absolute quantity of displacement, in other words, absolute displacement.

The phrase "detecting absolute displacement" described here means to detect a "relative" displacement quantity between the scale and the detecting head, as the absolute quantity, through an output of a detecting head without a calibration of a zero point (relative initial positions of scale and detecting head). For instance, the torque sensor having such a basic structure as in PTL 2 can acquire an incremental displacement quantity from the detecting head, but cannot detect the absolute displacement unless the relative initial positions of the scale and the detecting head are correct.

Here, PTL 1 discloses a structure for detecting the "relative" displacement quantity between the scale and the detecting head, as the absolute quantity. The encoder in PTL 1 arranges an absolute displacement track having a lattice arrangement of which the spacing is rough, and an incremental displacement track having a lattice arrangement of which the spacing is fine, in the scale. In addition, the encoder has each of a detecting head which detects light reflected from the absolute displacement track, and a detecting head which detects light reflected from incremental displacement track provided therein. By having such a structure, the encoder can obtain an absolute displacement value of a high resolution, by combining an absolute displacement signal which is obtained from the detecting head of the absolute displacement track, with an incremental displacement signal which is obtained from a head for detection of the incremental displacement track.

CITATION LIST

Patent Literature

PTL 1: Japanese Patent Application Laid-Open No. 2009-019876
PTL 2: Japanese Patent Application Laid-Open No. 2012-189516

SUMMARY OF INVENTION

Technical Problem

However, the optical absolute displacement encoder described in PTL 1 must arrange tracks having different lattice arrangements of at least two types of a rough lattice and a fine lattice or more types, in the scale. In addition, the optical absolute displacement encoder needs at least two or more types of detecting heads so as to correspond to these tracks, and accordingly has a problem that the structure becomes complicated and an encoder part is complicated and upsized.

Solution to Problem

With respect to the above described problems, an object of the present invention is to enable a displacement detecting apparatus to detect a displacement as an absolute quantity with a high resolution, with a simple structure, and further to enable an apparatus using the displacement detecting apparatus to detect a torque with high precision and high reliability, and to control a robot.

According to an aspect of the present invention, a displacement detecting apparatus comprises: a scale which has an optical pattern of a lattice arrangement; a detecting head which has light-receiving elements of a lattice arrangement, which detect the optical pattern of the scale; and a controlling apparatus which acquires a quantity of a relative rotational displacement of the detecting head with respect to the scale, based on a change of outputs of the light-receiving elements, at the time when the scale and the detecting head are relatively and rotationally displaced, wherein the controlling apparatus acquires the quantity of the relative rotational displacement of the detecting head with respect to the scale, by combining a quantity of a rough relative rotational displacement of the detecting head with respect to the scale, which has been acquired from an output of the total of light quantities that are output from each of the light-receiving elements in the detecting head, with a quantity of a fine relative rotational displacement between the scale and the detecting head, which has been acquired from an incremental displacement signal that is output from each of the light-receiving elements in the detecting head.

Alternatively, furthermore, the present invention has adopted a structure in which the above described scale and the above described light-receiving element are arranged so that at least any one of a direction of the lattice arrangement of the above described optical pattern of the above described scale and a direction of the lattice arrangement of the above described light-receiving element of the above described detecting head is inclined against a tangential direction of the relative rotational displacement between the above described scale and the above described detecting head, in the initial position of the relative rotational displacement of the above described scale and the above described optical pattern.

The displacement detecting apparatus according to the present invention can detect a rotational displacement as an absolute quantity with a high resolution, by using an optical linear encoder which uses a scale and a detecting head, and can reduce the size and the weight of itself. The displacement detecting apparatus according to the present invention relatively and rotationally displaces the scale and the detecting head which are structured of the lattice arrangements of the optical pattern and the light-receiving element, respectively. Alternatively, furthermore, the displacement detecting apparatus arranges the scale and the light-receiving element so that at least any one of a direction of the lattice arrangement of the optical pattern of the scale and a direction of the lattice arrangement of the light-receiving element of the detecting head is inclined against a tangential direction of the relative rotational displacement between the scale and the detecting head. By having such a structure, the displacement detecting apparatus acquires a rough relative rotational displacement quantity from the output of the total light quantity of the light-receiving element, and combines the acquired rough relative rotational displacement quantity with a fine relative rotational displacement quantity of the scale and the detecting head, which the displacement detecting apparatus has acquired from incremental displacement signals that are output from each of the light-receiving elements in the detecting head. Thereby, the displacement detecting apparatus detects the relative rotational displacement between the scale and the detecting head, as an absolute quantity. Because of this, the displacement detecting apparatus according to the present invention can acquire the relative rotational displacement quantity of the above described scale and detecting head, as the absolute quantity, and does not need zero point adjustment including the disassembly and maintenance of the apparatus even after an event such as a crash. In addition, the displacement detecting apparatus has such an excellent effect as to be capable of detecting displacement with high reliability, or of detecting a torque and controlling a robot with high reliability, based on the displacement detection with the high reliability.

Further features of the present invention will become apparent from the following description of exemplary embodiments with reference to the attached drawings.

BRIEF DESCRIPTION OF DRAWINGS

FIG. 1A is a front view of the apparatus; and FIG. 1B is a sectional view taken along the line 1B-1B in FIG. 1A.

FIG. 3A is a diagram illustrating an incremental displacement signal; and FIG. 3B is a diagram illustrating a rough displacement signal.

FIG. 5A is a front view of the scale; FIG. 5B is a top plan view of the scale and the detecting head; FIG. 5C is a side view of the scale and the detecting head; and FIG. 5D is a front view of the detecting head.

FIG. 15A is a perspective view of the robot apparatus; and FIG. 15B is a block diagram illustrating a configuration of a control system of the robot apparatus.

FIG. 17A is a graph illustrating the incremental displacement signal; and FIG. 17B is a graph illustrating an output voltage of a total light quantity, on this occasion.

FIGS. 19A and 19B are views illustrating a correction data table in Exemplary Embodiment 1 of the present invention, and for describing a relationship between an incremental displacement signal I and an output voltage T of a total light quantity, at the time when the correction data table is used.

FIGS. 20A, 20B and 20C are views for describing a relationship among an error ΔI of the incremental displacement signal I, the incremental displacement signal I, and the output voltage T of the total light quantity, in Exemplary Embodiment 1 of the present invention.

FIG. 21 is a view which describes coefficients.

DESCRIPTION OF EMBODIMENTS

Embodiments for carrying out the present invention will be described below with reference to exemplary embodiments which are illustrated in the attached drawings. Incidentally, the exemplary embodiments which will be described below are just a few examples, and those skilled in the art can appropriately modify, for instance, a detailed configuration, in such a range as not to deviate from the scope of the present invention. In addition, numeric values taken up in the present embodiment are reference numeric values, and do not limit the present invention.

Example 1

Figure 1A:
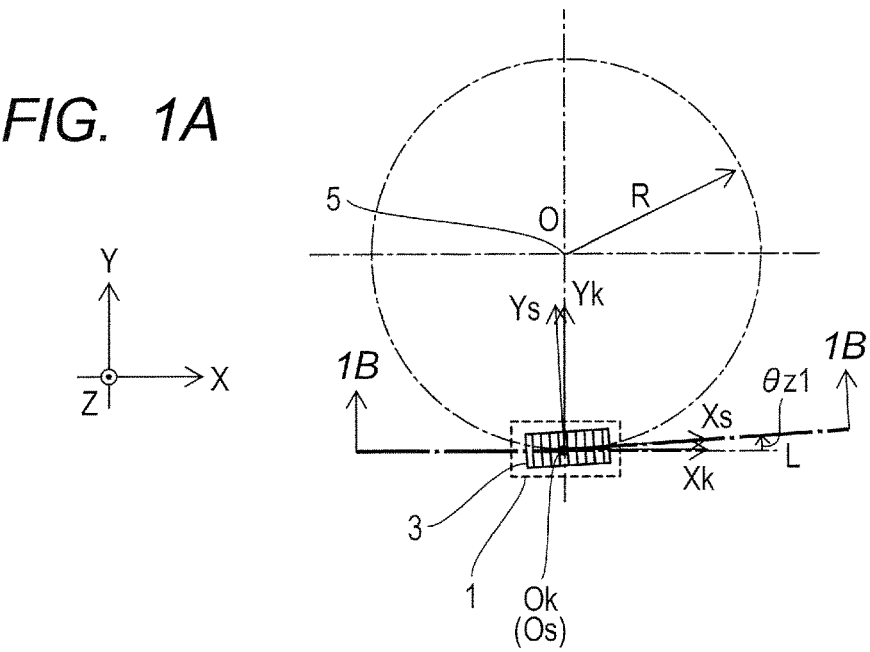
FIGS. 1A and 1B are views illustrating a positional relationship between a scale and a detecting head in a displacement detecting apparatus in Exemplary Embodiment 1 of the present invention.
Figure 1B:
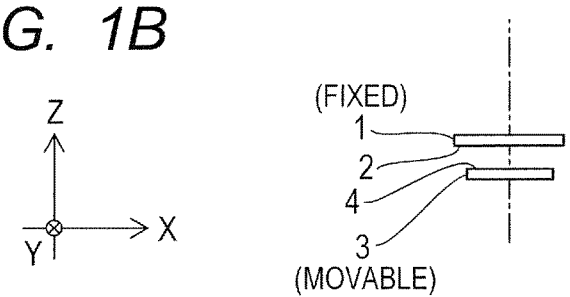

Firstly, one example of a schematic structure of a displacement detecting apparatus which has adopted the present invention will be described below, with reference to FIGS. 1A and 1B to FIG. 9. FIGS. 1A and 1B are views illustrating a schematic structure of a displacement detecting apparatus which has adopted the present invention. Incidentally, in the following drawings, each of coordinate axes of X, Y and Z is indicated by a symbol such as an arrow, an arrowhead and a feather of an arrow in the figures, as needed.

Figure 5A:
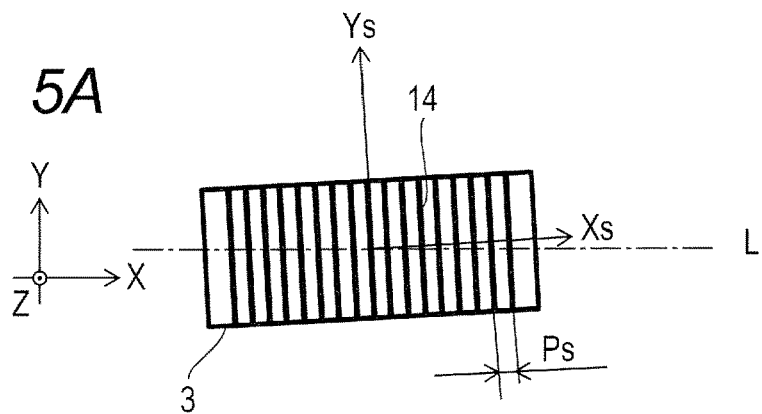
FIGS. 5A, 5B, 5C and 5D are views illustrating a structure of the scale and the detecting head in the displacement detecting apparatus in Exemplary Embodiment 1 of the present invention, in detail.
Figure 5B:
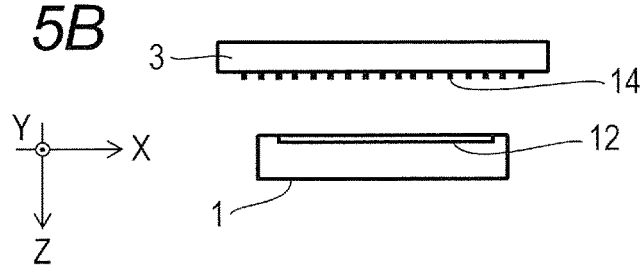
Figure 5C:
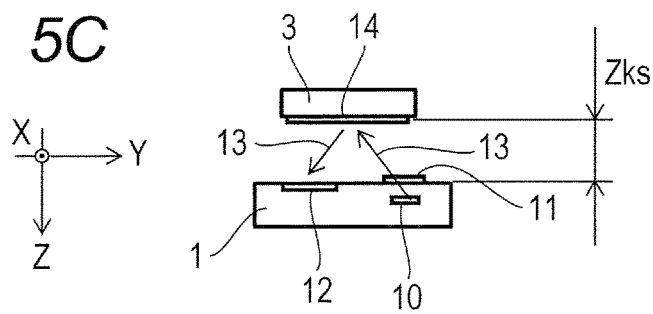
Figure 5D:
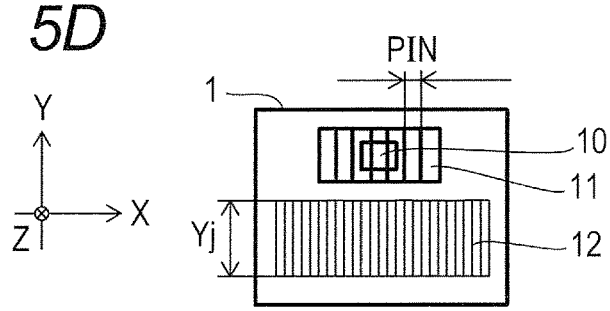
Figure 16:
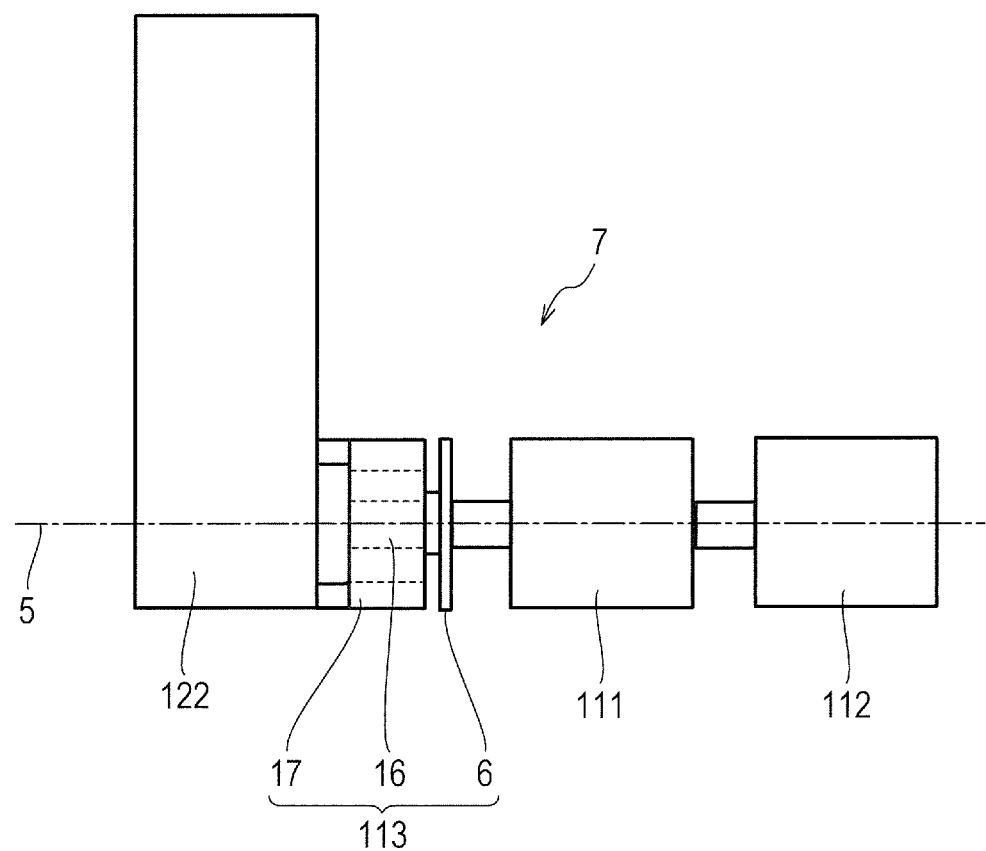
FIG. 16 is an explanatory view illustrating a schematic structure of a driving system of a joint of the robot apparatus which uses the displacement detecting apparatus in Exemplary Embodiment 5 of the present invention.

The displacement detecting apparatus in the present exemplary embodiment uses a scale 3 (FIG. 1A) having an optical pattern (lattice pattern 11: FIG. 5A) of a lattice arrangement, and a detecting head 1 having a light-receiving element array 12 (FIG. 5D) of a lattice arrangement, which detects the above described optical pattern, in order to detect the rotational displacement. The scale 3 and the detecting head 1 are arranged so as to be relatively and rotationally displaced by a body of rotation (for instance, elastic body 7: FIG. 16).

A controlling apparatus 900 (FIG. 4) acquires the quantity of the relative rotational displacement between the scale 3 and the detecting head 1, as an absolute quantity, based on a change of an output of the light-receiving element array 12 in the detecting head 1. This quantity of the relative rotational displacement between the scale 3 and the detecting head 1 can be treated, for instance, as a deformation quantity of the body of rotation (for instance, elastic body 7). In addition, in examples applied to a torque detecting apparatus (Exemplary Embodiments 4 and 5 which will be described later), a torque detecting apparatus 910 can detect a torque applied to the body of rotation (for instance, elastic body 7) from a deformation quantity of the body of rotation (elastic body 7), and the elastic coefficient (rigidity).

An encoder unit, in particular, in the displacement detecting apparatus in the present exemplary embodiment is structured of the detecting head 1 (dashed line) and the scale 3. For instance, when this displacement detecting apparatus is used for a force (for instance, torque) sensor, any one of the detecting head 1 and the scale 3 is mounted on a fixed member (6), and the other is mounted on an elastic body which is deformed by a torque.

In such a structure, the displacement detecting apparatus detects a quantity of the relative displacement between the scale 3 and the detecting head 1 at the time when the elastic body has been deformed, through an output signal of the detecting head 1, by a controlling apparatus 900 (FIG. 4), and thereby can detect a deformation quantity of the elastic body. At this time, if a physical property, for instance, an elastic coefficient of the elastic body is known, a force (for instance, torque) corresponding to the deformation quantity can be detected from the deformation quantity of the elastic body.

In the case of the torque sensor, in the present exemplary embodiment, the elastic body (unillustrated) is arranged so as to be torsionally deformed by a torque to be detected, for instance, while regarding a rotary axis 5 in parallel to a Z-axis as a center. In addition, the scale 3 is arranged on a circumference (dashed dotted line) distant from the rotary axis 5 of the elastic body by a radius R. In addition, as is illustrated in FIG. 1A, the detecting head 1 is fixed on a fixed member (fixed body: unillustrated in FIG. 1A) on the circumference (dashed dotted line) distant from the rotary axis 5 by the same radius R. Incidentally, as for which of the detecting head 1 and the scale 3 is arranged on which of the elastic body and the fixed member, a reverse arrangement is also considered.

FIG. 1B illustrates a cross section taken along the line 1B-1B in FIG. 1A; and a light-receiving surface 2 of the detecting head 1 is arranged in parallel to a plane including an X-axis and a Y-axis, as is illustrated in FIG. 1B. In addition, a light-receiving element array 12 of the detecting head 1 is arranged in a form of a lattice, on a straight line at predetermined pitches.

The detecting head 1 is, for instance, a reflection-type photosensor that will be described later, in which a light-emitting element 10 (FIGS. 5C and 5D) is arranged together with the light-receiving element array 12, and an index lattice pattern 11 is arranged on the light-emitting element 10. In addition, the light-receiving element array 12 of the detecting head 1 has sub-arrays of light-receiving elements which are arrayed in a plurality of phases, for instance, having a staggered arrangement, for instance, are arrayed in two phases (rows) of A and B, though the detailed illustration is omitted. The signals of two phases of A and B are obtained from the respective sub-arrays in the light-receiving element array 12, and are processed. Thereby, the incremental displacement signal can be acquired. The detailed example and the like of the sizes of the above described scale 3 and detecting head 1 will be described later in more detail.

FIGS. 5A to 5D illustrate structures of the scale and the detecting head in detail. As is illustrated in FIGS. 5A to 5D, a lattice pattern 14 of the scale 3 is arranged so as to face the light-receiving surface 2 of the detecting head 1. The lattice pattern 14 of the scale 3 is arranged so that a distance between the lattice pattern 14 and the light-receiving surface 2 of the detecting head 1 in a Z-axis direction becomes constant, when the elastic body (body of rotation) has rotated while regarding the rotary axis 5 as the center (FIG. 1A).

On the other hand, the scale 3 is arranged so as to overlap the detecting head 1 when viewed from the Z-axis direction, but in the present exemplary embodiment, the scale 3 is arranged so as to be inclined against a relative movement direction of the detecting head 1 and the scale 3. The scale 3 is inclined because a change of a total light quantity which corresponds to a rough relative rotational displacement quantity can be thereby detected from the detecting head 1, when the scale 3 and the detecting head 1 are relatively moved. Accordingly, in order to achieve the same object, such a structure is also considered that not the scale 3 but the detecting head 1 is arranged so as to be inclined against the relative movement direction of the scale 3 and the detecting head 1.

In order that the change of the total light quantity which corresponds to the rough relative displacement quantity can be detected from the detecting head 1, generally, any one of the scale 3 and the detecting head 1, for instance, is arranged so as to be inclined against a tangential direction of the relative rotational displacement between both of the scale 3 and the detecting head 1, in an initial position in the middle. Incidentally, when both of the scale 3 and the detecting head 1 are inclined, these inclination angles can be set in opposite directions to each other around the Z-axis (axis in parallel to Z-axis). The detailed sizes of the scale 3 and the detecting head 1 and the example of the above described inclination angles will be described later.

However, the structure in which the scale 3 and/or the detecting head 1 is arranged so as to incline against the relative movement direction of both the scale 3 and the detecting head 1 is not necessarily an indispensable requirement for detecting the change of the total light quantity which corresponds to the rough relative displacement quantity, in the structure of detecting the rotational displacement as in the present exemplary embodiment. For instance, an arrangement shall be considered in which the structures of each of the lattice arrangements in the detecting head 1 and the scale 3 correctly face and both of the detecting head 1 and the scale 3 are parallel to each other, at the initial position in the middle. In the case where the elastic body 7 is rotated from this initial position, and the detecting head 1 and the scale 3 are relatively and rotationally displaced, the structures of the lattice arrangements of both the detecting head 1 and the scale 3 are gradually inclined according to the rotation of the elastic body 7. Here, if the sizes are set such that the light-receiving element array 12 of the detecting head 1 becomes unable to see a part of a reflected image of the scale 3, the total light quantity signal (T which will be described later) to be output from the detecting head 1 results in changing according to the quantity of the relative rotational displacement between both of the scale 3 and the detecting head 1. In other words, also in this case, the total light quantity signal of the detecting head 1 can be used as the rough relative rotational displacement quantity.

The lattice pattern 14 of the scale 3 is arranged in a form of a lattice on a straight line at predetermined pitches. The lattice pattern 14 is formed of an optical pattern, for instance, such as a height of reflectivity and the like, which can be optically detected by the detecting head 1, which will be described later. The lattice pattern 14 can be formed on the scale 3 which is formed of an appropriate base material such as a metal and a resin, by using various film-forming technologies, for instance, of coating, printing and etching. Incidentally, a (surrounding) region except the lattice pattern 14 on the scale 3 or a region in the periphery of the scale 3 on the surface of the elastic body 7 which is a body of rotation is formed of a region having a low reflectivity (for instance, black), because the displacement detecting apparatus generates such a total light quantity signal (T) as will be described later.

As is illustrated in FIG. 1A, as for the coordinates of the detecting head 1, a direction in which the light-receiving element array 12 of the light-receiving surface 2 is arrayed shall be indicated by an Xk-axis, and a direction which is vertical to the Xk-axis in the light-receiving surface 2 shall be indicated by a Yk-axis. In addition, as for the coordinates of the scale 3, a direction in which the lattice pattern 14 of the scale 3 is arrayed shall be indicated by an Xs-axis, and a direction which is vertical to the Xs-axis in the plane of the lattice pattern 14 of the scale 3 shall be indicated by a Ys-axis.

When the scale 3 is inclined as described above, more specifically, the scale 3 is arranged in the following way. For instance, the scale 3 is arranged so that the Xs-axis of the scale 3 and a tangential line L of a circle O which passes the center Os of the scale 3, regards the rotary axis 5 as the center and has a radius R, at the center Os of the scale 3, form an angle $\theta z1$, on the plane containing the X-axis and the Y-axis. In addition, the Xk-axis of the detecting head 1 is arranged so as to become parallel to the tangential line L.

According to the above description, the Xs-axis of the scale 3 results in being arranged so as to form the angle $\theta z1$ with respect to the Xk-axis of the detecting head 1. On the other hand, the Xk-axis of the detecting head 1 is parallel to the tangential line L, which is fixed on the fixed member (fixed member 6 in FIG. 4) that is arranged in the vicinity of the elastic body 7. Accordingly, this structure is a structure in which the scale 3 is inclined against the relative movement direction of the detecting head 1 and the scale 3.

Figure 2:
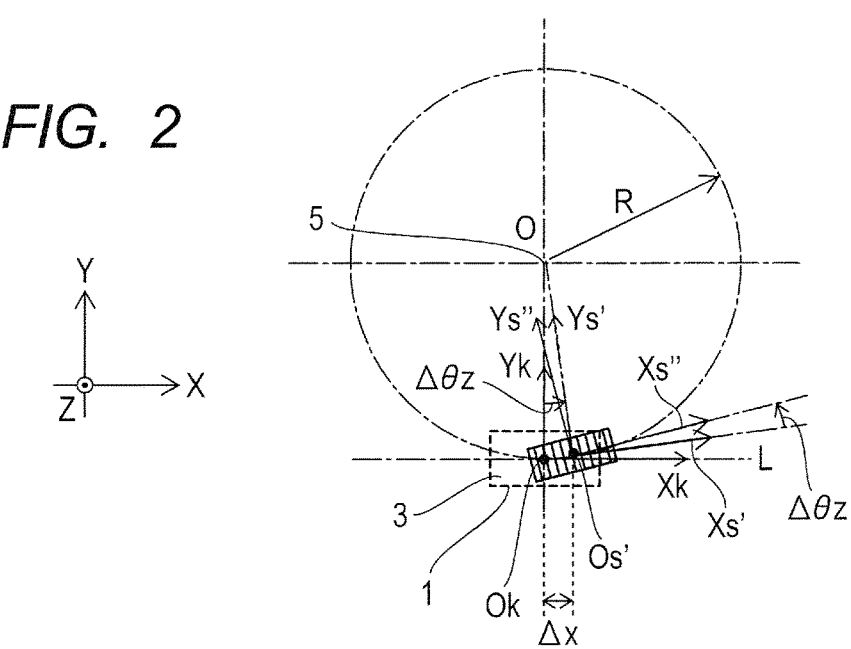
FIG. 2 is an explanatory view illustrating a positional relationship between the scale and the detecting head of the displacement detecting apparatus in Exemplary Embodiment 1 of the present invention, at the time of displacement.

In the above described structure, when the elastic body (unillustrated) receives such a force as to be torsionally deformed while regarding the rotary axis 5 as the center, the scale 3 is displaced with respect to the detecting head 1, as is illustrated in FIG. 2. FIG. 2 illustrates a change of a positional relationship of the scale 3 (rotating) with respect to the detecting head 1 (fixed), at the time when the elastic body (body of rotation) receives a force and is rotated only by $\Delta \theta z$.

As in FIG. 2, when the elastic body (body of rotation) is rotated with respect to the fixed member (6) on which the detecting head 1 is fixed, only by $\Delta \theta z$, while regarding the rotary axis 5 as the center, the scale 3 is displaced with respect to the detecting head 1 by $\Delta X$, in a direction of the tangential line L of the circle O, in other words, in the direction of the X-axis. Thus, when the scale 3 and the detecting head 1 are relatively displaced, the relative displacement between the scale 3 and the detecting head 1 can be acquired as an absolute quantity, from the incremental displacement signal (FIG. 3A) and the output signal of the total light quantity (FIG. 3B), which are obtained from the light-receiving element array 12 of the detecting head 1.

Figure 3A:
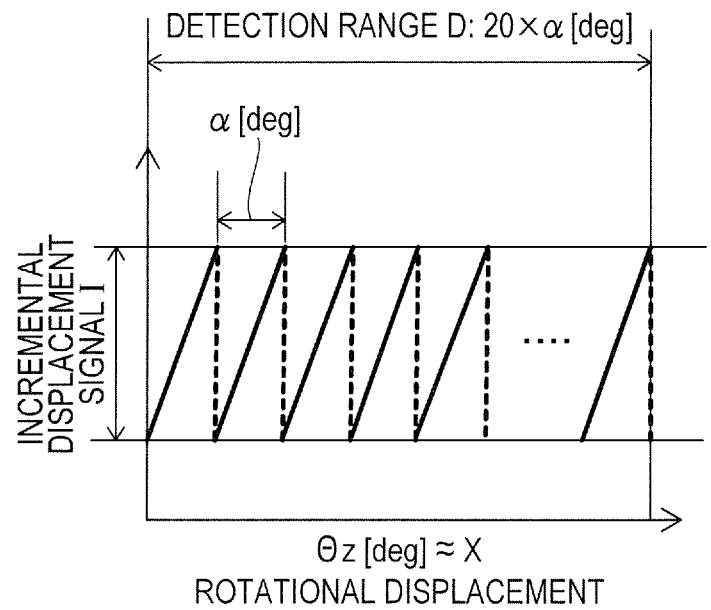
FIGS. 3A and 3B are views illustrating a method for processing a displacement signal having a high resolution in the displacement detecting apparatus in Exemplary Embodiment 1 of the present invention.

When the scale 3 and the detecting head 1 are relatively and rotationally displaced as is illustrated in FIGS. 1A and 1B to FIG. 2, the array of the lattice pattern 14 of the scale 3 moves with respect to the detecting head 1 in the X direction. Thereby, an incremental displacement signal as FIG. 3A is obtained, after the outputs of the two phases of A and B of the light-receiving element array 12 in the detecting head 1 have been subjected to processing (which will be described later). The incremental displacement signal (I) in FIG. 3A has an approximately constant period α (°) which is determined according to a size of the lattice arrangement of the light-receiving element array 12, a size of the lattice arrangement of the lattice pattern 14 of the scale 3, the radius R with which the above described scale 3 rotates and the like. In addition, a detectable range D of the incremental displacement signal (I) is formed of a plurality (20 pieces in illustrated example) of displacement signals each having the period α (°) which changes depending on the length (in array direction) and the like of the above described lattice arrangement.

Incidentally, a waveform of the incremental displacement signal (I) illustrated in FIG. 3A (or right-hand side in FIG. 8 which will be described later) is illustrated by a straight line in each of the periods (α), and the periods α are also illustrated so as to be equal almost over the detectable range D, but any of these illustrations is approximate and simple illustration. As in the present exemplary embodiment, when a linear encoder (detecting head 1 and scale 3) is relatively and rotationally displaced (or further when scale 3 is inclined), each of the waveforms and the periods α in the incremental displacement signal (I) changes according to the relative rotational displacement quantity, in a fine range. However, when the angle range of the detectable range D is small or the inclination of the scale 3 is small (for instance, ±0.5° or less), each of the waveforms and the periods α of the incremental displacement signal (I) may be treated as fixed values.

Hereafter, in the present specification, in order to facilitate understanding, each of the waveforms and the periods α of the incremental displacement signal (I) will be described on the assumption that the waveforms and the periods are each constant. However, when a strict measurement control is needed (or when detectable range D on specification corresponds to comparatively large relative rotational displacement), such a control may be performed as to correct a detected value of a fine relative rotational displacement quantity which is obtained from the incremental displacement signal (I), according to the change of the waveform and the period α of the same signal.

As in FIG. 3A, the change of the incremental displacement signal obtained from the light-receiving element array 12 is a periodic change having an approximately saw-tooth appearance over the whole detectable range D, and shows a periodic value with respect to the rotational displacement of the scale 3. In other words, this incremental displacement signal can detect a fine rotational displacement, but shows rotational displacements of several points for a value of one incremental signal. For instance, by just detecting the wave height of the period α (°) of the incremental displacement signal, the displacement detecting apparatus cannot acquire the relative displacement between the scale 3 and the detecting head 1, as the absolute quantity. If the displacement detecting apparatus cannot specify at least which period α(°) (ordinally) the measured wave height corresponds to, in the detectable range D of the incremental displacement signal, the displacement detecting apparatus cannot acquire the relative displacement between the scale 3 and the detecting head 1, as the absolute quantity.

Conventionally, a displacement detecting apparatus has specified which period α (°) (ordinally) the measured wave height corresponds to, in the detectable range D of the incremental displacement signal, on the condition that the initial position (zero point) is correctly calibrated at which a positional relationship between a specific scale 3 and a detecting head 1 becomes a specific state. For this reason, when a calibration of an initial position (zero point) has deviated due to a crash or the like, the displacement detecting apparatus has not been capable of obtaining a normal relative displacement output.

Figure 3B:
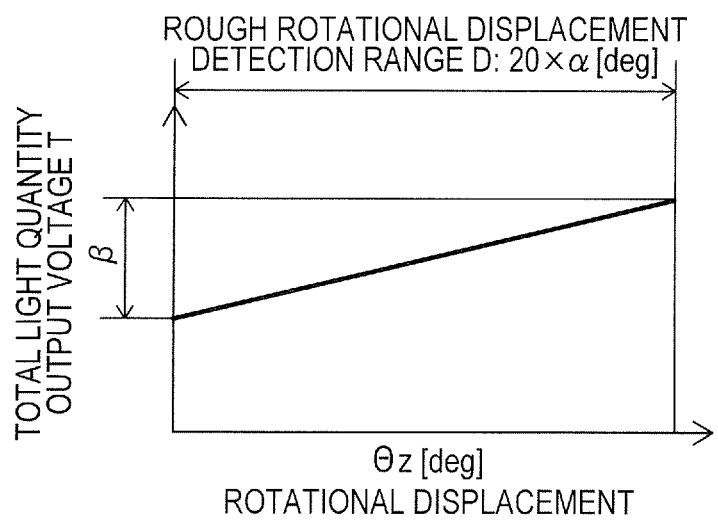

On the other hand, in the present exemplary embodiment, the scale 3 is inclined against the relative movement direction of the scale 3 and the detecting head 1 as in the above described way, and thereby a rough relative displacement signal which changes as is illustrated in FIG. 3B can be obtained from the output signal of the total light quantity of the light-receiving element array 12.

This output signal of the total light quantity of the light-receiving element array 12 can be obtained by the addition of voltages which correspond to the light-receiving quantity and are obtained from all of the elements in the light-receiving element array 12, for instance, by using a total light quantity amplifier (for instance, total light quantity I-V conversion unit 903 in FIG. 4) which will be described later.

As has been described above, in the present exemplary embodiment, the scale 3 is inclined against the relative movement direction of the detecting head 1 and the scale 3, and accordingly when the total light quantity signal (T) is extracted from all of the elements of the light-receiving element array 12, this total light quantity signal (T) results in showing a change as illustrated in FIG. 3B.

Here, the more detailed case shall be considered where the scale 3 is inclined counterclockwise in the figure at the position in the middle at which the detecting head 1 correctly faces the scale 3, as is illustrated in FIG. 1A. In this case, when the scale 3 rotates counterclockwise, the inclination angle between the scale 3 and the light-receiving element array 12 (lattice arrangement) of the detecting head 1 becomes larger, and light reflected from the scale 3 (lattice pattern 14) becomes partially cut off from the detectable range of the light-receiving element array 12. In addition, when the scale 3 rotates clockwise, on the contrary, the scale 3 and the light-receiving element array 12 (lattice arrangement) of the detecting head 1 becomes gradually parallel, and approaches a state in which the light reflected from the scale 3 (lattice arrangement) fits into the detectable range of the light-receiving element array 12.

Because of this, the total light quantity signal (T) which has been acquired from all of the elements of the light-receiving element array 12 changes so as to approximately monotonically increase or decrease from one end to the other end of the detectable range D, as is illustrated in FIG. 3B. Specifically, as the scale 3 is rotationally displaced (Δθz), the scale 3 inclines against the detecting head 1 by an angle Δθz, and thereby the total light quantity signal (T) which has been acquired from all of the elements of the light-receiving element array 12 changes so as to approximately monotonically increase (or decrease) in the detectable range D (changed width β).

In other words, the correspondence of the total light quantity signal (T) with the rotational displacement of the scale 3 is rough, but the value determines the rotational displacement in a one-to-one relationship, in the detectable range D. Accordingly, this total light quantity signal (T) which has been acquired from all of the elements of the light-receiving element array 12 may be treated as a rough quantity of the rotational displacement of the scale 3 with respect to the detecting head 1.

Accordingly, by combining the rough relative rotational displacement quantity in FIG. 3B with the fine relative rotational displacement quantity in FIG. 3A, specifically, by interpolating the fine rotational displacement in FIG. 3A in the rough rotational displacement in FIG. 3B, the displacement detecting apparatus can detect the quantity of the relative rotational displacement between the detecting head 1 and the scale 3, as the absolute quantity. Thereby, the displacement detecting apparatus can detect the quantity of the relative rotational displacement between the detecting head 1 and the scale 3, without depending on the zero point adjustment. In other words, by combining the rough rotational displacement of a wide range with the fine rotational displacement of a fine range and a high resolution, the displacement detecting apparatus can always detect the absolute rotational displacement without needing the zero point adjustment. According to a detection principle of which the outline has been described in the above, the displacement detecting apparatus is enabled to always detect the absolute rotational displacement, by using only one set of the detecting head 1 and the scale 3.

Here, the case also shall be considered where the scale 3 is not inclined against the relative movement direction of the detecting head 1 and the scale 3, in the arrangement of the scale 3 and the detecting head 1 as illustrated in FIG. 1A and FIG. 2. Specifically, this arrangement is the arrangement in which the structures of the respective lattice arrangements of the detecting head 1 and the scale 3 are parallel, at the initial position in the middle. In this case, the change of the total light quantity signal (T) shows a change as illustrated by a dashed line in FIG. 9 which will be described later. Specifically, the total light quantity signal (T) shows the largest light quantity value when the detecting head 1 and the scale 3 face each other at the initial position in the middle, and when the scale 3 is rotationally displaced counterclockwise and clockwise, in any case, the value decreases at an approximately equal rate of change.

Accordingly, even in the case where the scale 3 (or detecting head 1) is not inclined, signal processing of combining the rough rotational displacement with the fine rotational displacement is not necessarily impossible. For instance, in the case where both of the scale 3 and the detecting head 1 are arranged so that the scale 3 and the detecting head 1 correctly face each other at the initial position in the middle and both of the scale 3 and the detecting head 1 are not inclined, the rough rotational displacement which is detected through the total light quantity signal (T) shows a symmetrical change in the right side and in the left side from the middle of the detectable range D. Accordingly, there is a possibility that a unit (or process) is needed which specifies whether at least the scale 3 is in any side of the right side and the left side from the middle of the detectable range D. In addition, in this structure, there is a possibility that the zero point adjustment cannot be eliminated which has been a problem in a conventional technology, for instance.

However, for instance, in a torque sensor or the like, which detects a driving torque of a joint of a robot apparatus that will be described later, usually, the controlling apparatus can always clearly recognize the rotating and driving direction of the joint. If being used in such an application, even in the case where the scale 3 (or detecting head 1) is not inclined, the displacement detecting apparatus can detect information corresponding to the rough rotational displacement, by combining information in the rotation direction with the total light quantity signal (T) of the light-receiving element array 12. In addition, the displacement detecting apparatus can detect the displacement by combining the rough rotational displacement with the fine rotational displacement, and does not need the zero point adjustment.

Such a circumstance is similar, for instance, also in a torque sensor or the like, which is used for such an application as to rotate an elastic body 7 only in a fixed direction.

When the scale 3 (or detecting head 1) is not inclined, both of the scale 3 and the detecting head 1 are arranged at the initial position in the middle so that the scale 3 and the detecting head 1 correctly face each other and are not inclined at the position, for instance. In this case, the total light quantity signal (T) which is used as the rough rotational displacement shows such a change as a dashed line in FIG. 9, and other structures and signal processing are similar to those in the case where the scale 3 (or detecting head 1) is inclined.

On the other hand, according to the structure in which the scale 3 is inclined as in the present exemplary embodiment, the displacement detecting apparatus can make the rough rotational displacement which is detected through the total light quantity signal (T) change so as to approximately monotonically increase (or decrease) from one end to the other end of the detectable range D. In addition, the width ($\beta$ in FIG. 3B) of the change of the total light quantity signal (T) over the detectable range D is larger compared to that in the structure in which the scale 3 is not inclined, and the displacement detecting apparatus can retrieve a signal corresponding to the rough rotational displacement with high precision.

The structure and the operation of the displacement detecting apparatus in the present exemplary embodiment will be described in more detail below with reference to FIGS. 1A and 1B to FIG. 9. FIG. 4 illustrates an example of the whole structure of the displacement detecting apparatus, which includes the structure of a control system.

Figure 4:
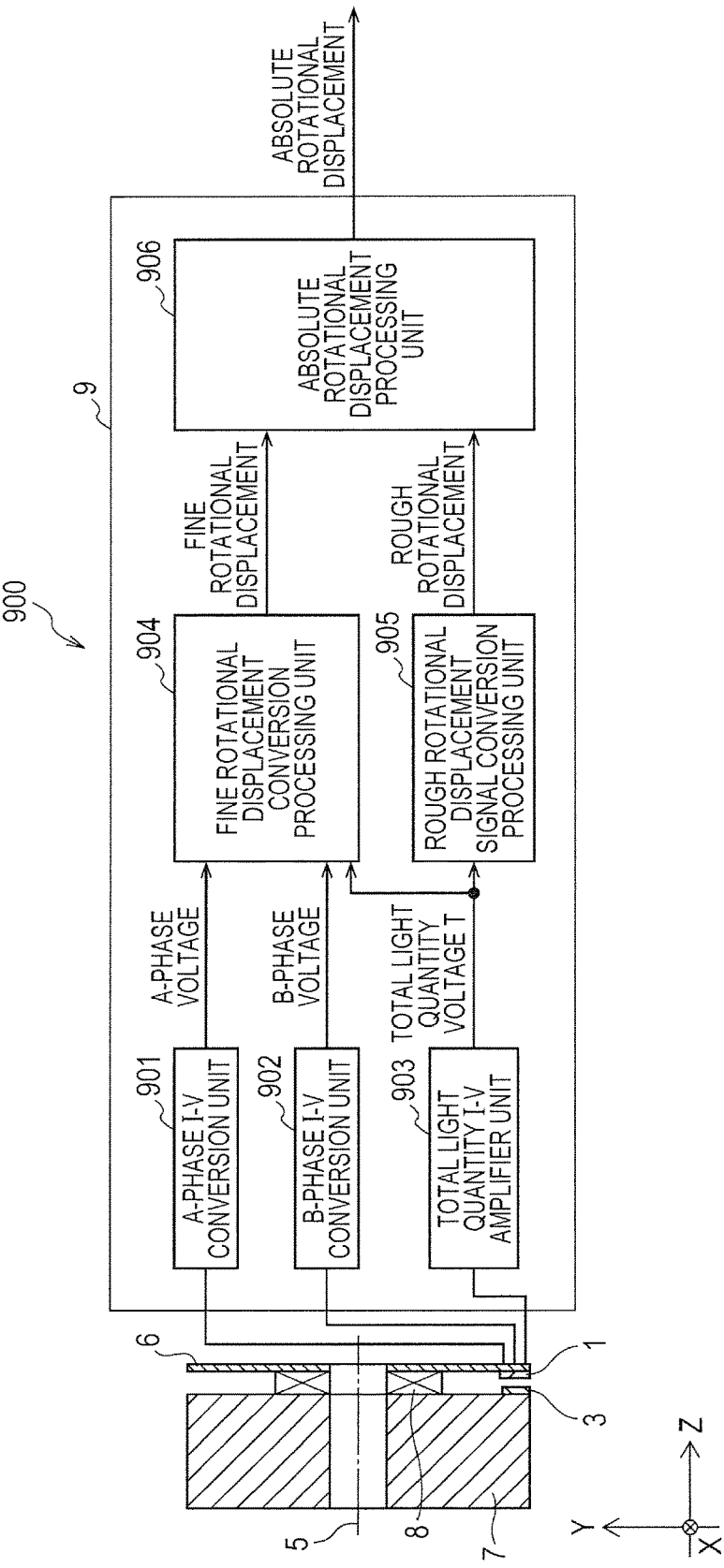
FIG. 4 is a block diagram illustrating a configuration of a control system of the displacement detecting apparatus in Exemplary Embodiment 1 of the present invention.

The displacement detecting apparatus in FIG. 4 includes the elastic body 7 (body of rotation), the fixed member 6 arranged in the vicinity of the elastic body 7, a rotation guiding member 8, the scale 3, the detecting head 1, and a processing circuit 9.

The elastic body 7 has a cylindrical shape, is connected to the fixed member 6 through the rotation guiding member 8, and rotates while regarding the rotary axis 5 parallel to the Z-axis as the center. The surface of revolution of this elastic body 7 is arranged so as to be parallel to the plane containing the X-axis and the Y-axis. The fixed member 6 has, for instance, a circular plate shape, and is arranged so that the center of the circle of the fixed member 6 coincides with the rotary axis 5. The fixed member 6 is arranged in parallel to the plane containing the X-axis and the Y-axis. In the present exemplary embodiment, the scale 3 is fixed on a surface on the elastic body 7, which faces the fixed member 6. In addition, the scale 3 is arranged in the vicinity of the outer peripheral edge of the elastic body 7. Incidentally, FIG. 1A (though FIG. 2, and FIG. 6 and FIG. 7 which will be described later are also similar) corresponds to a figure viewed from the positive direction of the arrow Z-axis in FIG. 4.

The scale 3 has the lattice pattern 14 formed thereon which extends in a longitudinal direction, as is illustrated in FIG. 5A. The lattice pattern 14 of the scale 3 is arranged so as to be parallel to the plane containing the X-axis and the Y-axis. In addition, the lattice pattern 14 of the scale 3 is arranged so as to face the fixed member 6.

Figure 6:
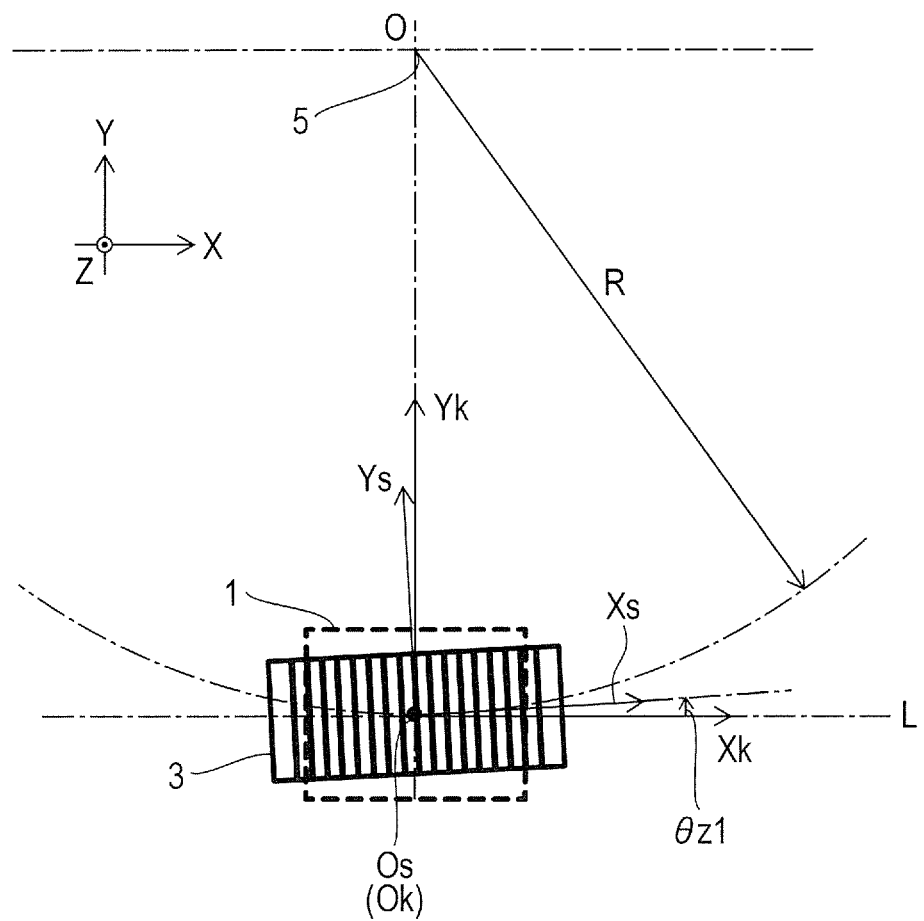
FIG. 6 is an explanatory view illustrating a positional relationship between the scale and the detecting head in the displacement detecting apparatus in Exemplary Embodiment 1 of the present invention, in detail.

As is illustrated in FIG. 6, the scale 3 is arranged on the plane containing the X-axis and the Y-axis so that a first line Xs which extends in the longitudinal direction of the scale 3, and the tangential line L of the circle O which passes the center Os of the scale 3 and regards the rotary axis 5 as the center, forms an angle $\theta z1$, at the center Os of the scale 3.

In the present exemplary embodiment, the radius R of the circle O which arranges the scale 3 on its circumference is set at 30 mm, and θz1 which is the inclination angle of the scale 3 is set at θz1=0.2° (approximately).

The detecting head 1 is fixed on the surface which is in the vicinity of the outer peripheral edge of the fixed member 6 and faces the elastic body 7. The detecting head 1 is arranged so that a distance Zks between the detecting head 1 and the lattice pattern 14 of the scale 3 is kept constant even while the elastic body 7 relatively rotates with respect to the fixed member 6 while regarding the rotary axis 5 as the center. In addition, the detecting head 1 is arranged so as to overlap the scale 3 when viewed from the Z-axis direction and to face a surface 4 of the lattice pattern 14 of the scale 3.

FIGS. 5A to 5D illustrate the lattice pattern 14 of the scale 3, and the light-emitting element 10 and the light-receiving element array 12 of the detecting head 1 in the displacement detecting apparatus, in detail.

The detecting head 1 includes the light-emitting element 10, the index lattice pattern 11 and the light-receiving element array 12. A surface containing the light-emitting element 10, the index lattice pattern 11 and the light-receiving element array 12 of the detecting head 1 is arranged in parallel to the plane which contains the X-axis and the Y-axis.

In addition, the light-receiving element array 12 is structured so that a plurality of light-receiving elements are aligned in one row so as to be parallel to each other. On the plane containing the X-axis and the Y-axis, the direction of the index lattice pattern 11 and the direction in which the light-receiving element array 12 are arrayed are arranged so as to become parallel to the tangential line L of the circle O at the center Os of the scale 3, which passes the center Os of the scale 3 and regards the rotary axis 5 as the center. In addition, the contour of the detecting head 1 is arranged so as to become parallel to the direction of the index lattice pattern 11 and the direction in which the light-receiving element array 12 are arrayed. In addition, the surface which contains the light-emitting element 10, the index lattice pattern 11 and the light-receiving element of the detecting head 1 is arranged so as to face the surface 4 of the lattice pattern 14 of the scale 3.

In the above described arrangement of the scale 3 and the detecting head 1, a light beam 13 which is emitted from the light-emitting element 10 passes through the index lattice pattern 11, and reaches the surface 4 of the lattice pattern 14 of the scale 3. The light beam 13 which has been reflected by the lattice pattern 14 of the scale 3 reaches the light-receiving element array 12. In the present exemplary embodiment, a pitch Pin of the index lattice pattern 11 of the detecting head 1 shall be set at 4 μm. In addition, the pitch Ps of the lattice pattern 14 of the scale 3 shall be set at 4 μm. In addition, a distance Zks between the surface which contains the light-emitting element 10, the index lattice pattern 11 and the light-receiving element array 12 of the detecting head 1, and the lattice pattern 14 of the scale 3, shall be set at 1 mm.

Incidentally, in order that the displacement detecting apparatus generates the total light quantity signal (T) which changes as in FIG. 3B and as in the right side of FIG. 9, the sizes of the scale 3 and the detecting head 1 are needed to be set in the following way. Specifically, in the state in which the lattice structures of the scale 3 and the light-receiving element array 12 of the detecting head 1 are parallel to each other, the width (in Y-axis direction) of an image of the scale 3, which is formed by light that has been emitted from the light-emitting element 10 and has been reflected onto the light-receiving element array 12, needs to be approximately coincide with the width of the light-receiving element array 12. A size relationship between the width of the image of the scale 3 and the width (Yj described below) (in Y-axis direction) of the light-receiving element array 12 is achieved by the appropriate setting of the width (in Y-axis direction) of the scale 3, the distance between the detecting head 1 and the scale 3, the reflection angle of the illumination light of the light-emitting element 10, and the like.

Here, the state shall be considered in which the width (in Y-axis direction) of the image of the scale 3 approximately coincides with the width of the light-receiving element array 12, in the state in which the scale 3 and the light-receiving element array 12 of the detecting head 1 correctly face each other so that the lattice structures thereof become parallel to each other. In the case where the scale 3 is arranged so as to be inclined, as has been described above, at this time, the total light quantity signal (T) output from the light-receiving element array 12 shows, for instance, a value in the right end side of FIG. 3B or FIG. 9. In addition, this state corresponds to a state in which the elastic body 7 rotates clockwise, and the scale 3 has approached a position at which the scale 3 becomes parallel to the light-receiving element array 12, for instance, in FIG. 1A. Specifically, when the sizes concerning the width (in Y-axis direction) of the image of the scale 3 and the width of the light-receiving element array 12 are set as in the above description, the illumination light which has been reflected from the scale 3 irradiates almost the whole of the light-receiving element array 12. At this time, the total light quantity signal (T) becomes the largest value.

On the other hand, as the scale 3 rotates and inclines against the light-receiving element array 12, from the state in which the scale 3 and the light-receiving element array 12 of the detecting head 1 correctly face each other so that the lattice structures thereof become parallel to each other, the image of (light reflected from) the scale 3 becomes partially cut off from the light-receiving region of the light-receiving element array 12. Thereby, the total light quantity signal (T) which is output from the light-receiving element array 12 results in gradually decreasing from the (largest) value, for instance, in the right end side of FIG. 3B or FIG. 9. This process corresponds to such a process that the signal value of the total light quantity signal (T) gradually decreases from the right end of FIG. 3B or FIG. 9, to the left end. This process also corresponds to such a process that the elastic body 7 rotates counterclockwise, and the inclination angle of the scale 3 against the light-receiving element array 12 increases, for instance, in FIG. 1A.

Next, in the displacement detecting apparatus of the present exemplary embodiment, the relative positions and orientations of the scale 3 and the detecting head 1 before and after the elastic body 7 rotates will be described below with reference to FIG. 6 and FIG. 7.

FIG. 6 illustrates the center of the rotation and the relative positions and orientations of the scale 3 and the detecting head 1, at the time when the displacement detecting apparatus is viewed from the Z-axis direction, in detail. In addition, FIG. 7 illustrates the center of the rotation and the relative positions and orientations of the scale 3 and the detecting head 1, after the elastic body 7 of the displacement detecting apparatus has rotated, in detail. In addition, FIG. 6 and FIG. 7 may be considered also to be detailed enlarged illustrations of FIG. 1A and FIG. 2, respectively.

In FIG. 6, as for the coordinates of the scale 3, a direction in which the lattice pattern 14 formed in the longitudinal direction of the scale 3 is arrayed shall be represented by an Xs-axis, and a direction perpendicular to the Xs-axis in the plane of the lattice pattern 14 of the scale 3 shall be represented by a Ys-axis. The scale 3 is arranged so that the Xs-axis of the scale 3 and a tangential line L of the circle O which passes the center Os of the scale 3 and regards the rotary axis 5 as the center, at the center Os of the scale 3, form an angle θz1, on the plane containing the X-axis and the Y-axis. This angle θz1 is set at approximately 0.2° in the present exemplary embodiment.

In addition, as for the coordinates of the detecting head 1, a direction of the index lattice pattern 11 and a direction in which the light-receiving element array 12 is arrayed shall be represented by an Xk-axis, and a direction perpendicular to the Xk-axis in the plane containing the index lattice pattern 11 and the light-receiving element array 12 shall be represented by a Yk-axis.

As has been described above, in the middle (initial) position of FIG. 6, the Xs-axis of the scale 3 is arranged so as to form the angle θz1 (=0.2°) with respect to the Xk-axis of the detecting head 1. In addition, the width Yj in the Yk-axis direction of the light-receiving element array 12 of the detecting head 1 is set at approximately 0.4 mm.

Next, suppose that an external force of torsionally deforming the elastic body 7 has been applied to the elastic body 7. Then, the fixed member 6 and the elastic body 7 relatively rotate by Δθz while regarding the rotary axis 5 as the center, as is illustrated in FIG. 7. At this time, the scale 3 rotates on the radius R (=30 mm), and moves on the detecting head 1. Specifically, the scale 3 moves by ΔX in the X-axis direction and by ΔY in the Y-axis direction with respect to the detecting head 1, and rotates by Δθz in the rotation direction around the Z-axis, in other words, in a θz direction. Here, the coordinates of the scale 3 at the time when the scale 3 has moved by ΔX in the X-axis direction and by ΔY in the Y-axis direction with respect to the detecting head 1 shall be represented by an Xs'-axis and a Ys'-axis. In addition, the coordinates of the scale 3 at the time when the scale 3 has rotated by Δθz in a θz direction from the Xs'-Ys' coordinate shall be represented by an Xs"-axis and a Ys"-axis.

Figure 7:
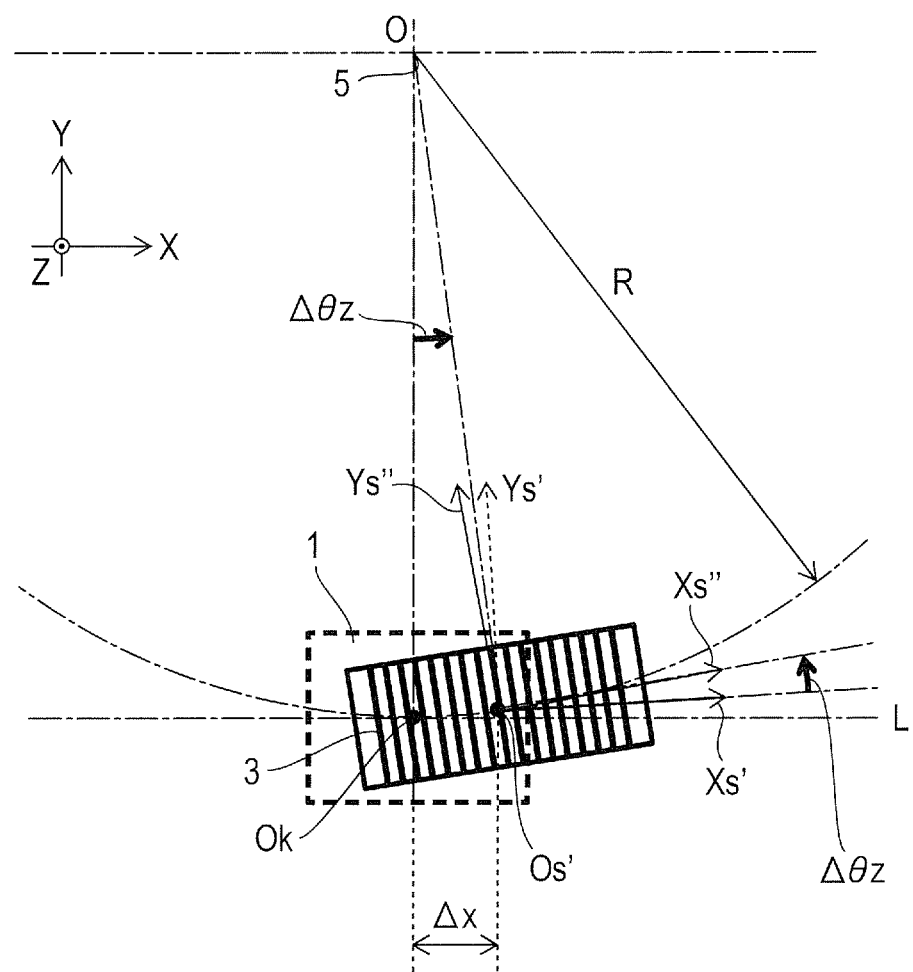
FIG. 7 is an explanatory view illustrating a positional relationship between the scale and the detecting head of the displacement detecting apparatus in Exemplary Embodiment 1 of the present invention, at the time of displacement.

When the scale 3 is rotationally displaced with respect to the detecting head 1, as is illustrated in FIG. 6 and FIG. 7, the control system in FIG. 4 acquires the incremental displacement signal (I) which corresponds to the fine rotational displacement, and the total light quantity signal (T) which corresponds to the rough rotational displacement, from the light-receiving element array 12. By combining these incremental displacement signal (I) and total light quantity signal (T) with each other, in the process which will be described later, the displacement detecting apparatus can detect the rotation quantity of the elastic body 7 (body of rotation) through the relative rotational displacement between the scale 3 and the detecting head 1, as the absolute quantity.

Incidentally, as is clear from the signal processing which will be described later, in the operation of FIG. 6 and FIG. 7, the incremental displacement signal which is output from the light-receiving element array 12 preferably needs to have consistency in the whole detectable range (D) at the time when the elastic body 7 rotates. For instance, suppose that in a rotation region of a certain elastic body 7, one lattice (image) of the scale 3 intersects with one light-receiving element of the light-receiving element array 12, while the elastic body 7 finely rotates. This action mode is an anticipated action in the case where the detecting head 1 and the scale 3 are used as the linear encoder. However, in the case where the detecting head 1 and the scale 3 are used for detecting the rotational displacement as in the present exemplary embodiment, if the rotation angle of the elastic body 7 has been larger, such a situation can occur that two or more numbers of (images of) lattices of the scale 3 intersect in the rotation region of the elastic body 7. In this case, one light-receiving element of the light-receiving element array 12 does not detect one (image of) the lattice of the scale 3 as in the above description, but results in simultaneously detecting a plurality of (images of) lattices of the scale 3. In the case, there is a possibility that the obtained incremental displacement signal becomes a signal corresponding to a resolution which is different from that in the case where the light-receiving element array 12 and the scale 3 are parallel to each other.

Then, at least at the middle (initial) position of FIG. 6, firstly, the angle θz1 between the Xs-axis of the scale 3 and the Xk-axis of the detecting head 1 needs to satisfy the following conditions. Specifically, the above described angle θz1 should be set so as to fit into the range of the following expression (1), by the length Yj in the Yk-axis direction of the light-receiving element array 12 of the detecting head 1 and the pitch Ps of the lattice pattern 14 of the scale 3.

$$\arctan(-Ps/Yj) < \theta z1 < \arctan(Ps/Yj) \tag{1}$$

The angle range of this expression (1) corresponds to an angle range in which two or more images of the optical pattern of the scale 3 do not simultaneously intersect with one light-receiving element of the light-receiving element array 12, on the light-receiving surface of the detecting head 1. In addition, this expression (1) concerning the θz1 expresses a range of the inclination angle θz1 by which the lattice arrangement of the optical pattern of the scale 3 (or direction of lattice arrangement of the above described light-receiving element) inclines against the tangential direction of the relative rotational displacement, at least at the initial position of this relative rotational displacement.

In addition, the case shall be considered where θz1 in the above described expression (1) is replaced with the inclination angle θz against the Xk-axis of the detecting head 1, which the Xs-axis of the scale 3 can form while the elastic body 7 rotates. The expression concerning this inclination angle θz results in showing an angle range in which the light-receiving element array 12 can output an incremental displacement signal that corresponds to the unique resolution. At the same time, the expression concerning this inclination angle θz may be considered as a displacement detectable range of the displacement detecting apparatus in the present exemplary embodiment (or torque detectable range of torque sensor). Specifically, this expression in which θz1 is replaced with θz corresponds to an angle range in which two or more images of the optical pattern of the scale 3 do not simultaneously intersect with one light-receiving element of the light-receiving element array 12, on the light-receiving surface of the detecting head 1. In addition, this expression suggests that such a range of the relative rotational displacement between the detecting head 1 and the scale 3 as to satisfy the above described θz corresponds to a suitable detection (detectable) range of the relative rotational displacement of the displacement measuring apparatus.

Anyhow, if the inclination angle (θz1 or θz) of the scale 3 at the initial position in the middle, or in a period while the elastic body 7 rotates, is within the above described range, the displacement detecting apparatus can acquire an output signal having the approximately unique period α, from the A and B phases of the light-receiving element array 12. Thereby, the displacement detecting apparatus can acquire the incremental displacement signal I which corresponds to the unique resolution, can surely and correctly detect the displacement, and can surely and correctly detect the torque based on the detected displacement.

Here, a detailed configuration example of the control system of the displacement detecting apparatus in the present exemplary embodiment will be described with reference to FIG. 4. FIG. 4 illustrates a configuration example of a processing circuit 9 which constitutes a control system of the displacement detecting apparatus.

In FIG. 4, the processing circuit 9 includes an A-phase I-V conversion unit 901, a B-phase I-V conversion unit 902, a total light quantity I-V conversion unit 903, a fine rotational displacement signal conversion processing unit 904, a rough rotational displacement signal conversion processing unit 905 and an absolute rotational displacement processing unit 906. Portions concerning A/D conversion among each of these processing units which constitute the processing circuit 9 can be formed of a hardware circuit such as an A/D converter. In addition, portions concerning the input/output and conversion of a digital signal can be structured of a hardware circuit such as a DSP (digital signal processor). Alternatively, the portions concerning the digital signal processing can also be realized by making a CPU (see Exemplary Embodiment 5 that will be described later) which is structured of a general-purpose microprocessor or the like execute a program for signal processing.

In the case where the displacement detecting apparatus achieves the displacement detection in the present exemplary embodiment by making the CPU execute a control program for signal processing, in particular, the displacement detecting apparatus can achieve the displacement detection processing which is attained by each of the above described units 901 to 906, by a control program for making the CPU execute each of the following processes (steps): firstly acquiring a quantity of the rough relative rotational displacement between the scale 3 and the detecting head 1, which has been acquired from the total output of the light quantities output from each of the light-receiving element arrays 12 of the detecting head 1;
secondly acquiring a quantity of the fine relative rotational displacement between the scale 3 and the detecting head 1, which has been acquired from the incremental displacement signal that is output from each of the light-receiving element arrays 12 of the detecting head 1; and
acquiring the quantity of the relative rotational displacement between the scale 3 and the detecting head 1, by combining the rough relative rotational displacement quantity which has been acquired in the first acquiring process, with the fine relative rotational displacement quantity which has been acquired in the second acquiring process.

On the other hand, the A-phase I-V conversion unit 901 in FIG. 4 converts a current signal which an A-phase light-receiving element of the light-receiving element array 12 generates in proportion to the light-receiving quantity of the light reflected from the scale 3, into a voltage signal, and generates an A-phase voltage signal. Similarly, the B-phase I-V conversion unit converts a current signal which a B-phase light-receiving element of the light-receiving element array 12 generates in proportion to the light-receiving quantity of the light reflected from the scale 3, into a voltage signal, and generates a B-phase voltage signal.

In addition, the total light quantity I-V conversion unit 903 converts current signals which all of the light-receiving elements of the light-receiving element array 12 generate in proportion to the light-receiving quantities of the reflected light output from the scale 3, into a voltage signal corresponding to the current signal, and generates a total light quantity signal T (total light quantity voltage signal). In other words, the total light quantity I-V conversion unit 903 adds all of the light quantities of the A-phase light-receiving element and the B-phase light-receiving element.

Figure 8:
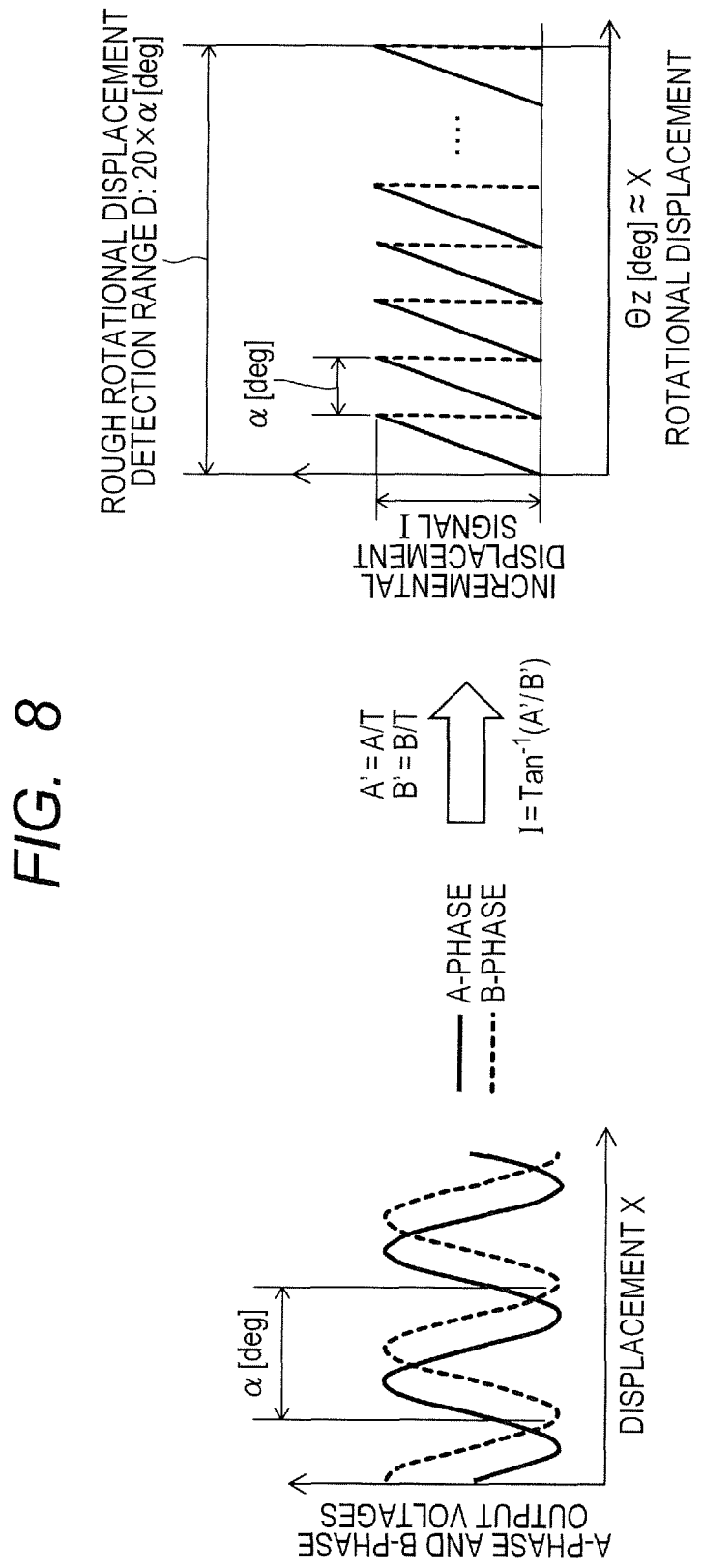
FIG. 8 is an explanatory view illustrating signal processing of an incremental displacement signal of a high resolution in the control system in FIG. 4.

The fine rotational displacement signal conversion processing unit 904 converts an analog signal of the A-phase voltage signal, the B-phase voltage signal and the total light quantity voltage signal (T) into digital signals, and generates a digital signal which corresponds to the fine rotational displacement. FIG. 8 illustrates the signal processing of the fine rotational displacement signal conversion processing unit 904. The fine rotational displacement signal conversion processing unit 904 can be structured by using a hardware, for instance, such as an A/D converter and a signal processor.

In FIG. 8, the fine rotational displacement signal conversion processing unit 904 generates a normalized A-phase signal (A'), by dividing a digital sine wave signal A (period α) of the A-phase by a digital signal (T') of the total light quantity voltage. In addition, the fine rotational displacement signal conversion processing unit 904 generates a normalized B-phase signal (B'), by dividing a digital sine wave signal B (period α) of the B-phase by the digital signal (T') of the total light quantity voltage. Furthermore, the fine rotational displacement signal conversion processing unit 904 subjects the normalized A-phase signal (A') and the normalized B-phase signal (B') to an arctangent computation, and generates an incremental displacement signal I which is an output value that is linear to the rotational displacement (ΔX) of the elastic body 7. This incremental displacement signal I shows a displacement ΔX at the time when the scale 3 has moved in the X-axis direction with respect to the detecting head 1. When the rotational displacement is fine as in the inside of one period α or the like, in particular, the displacement ΔX in this range can be regarded as a detected quantity which corresponds to the rotational displacement Δθz. As in the above described way, the fine rotational displacement signal conversion processing unit 904 generates the fine rotational displacement signal I.

In general, when an incremental encoder of the high-resolution converts the voltage signals of the A-phase and the B-phase into digital signals, the number of bits and the frequency band of the A/D converter are restricted. Because of this, when the elastic body 7 is displaced at high speed by a crash and the like, for instance, the frequency exceeds the convertible frequency of the A/D converter, and the displacement detecting apparatus occasionally results in missing the present displacement.

For this reason, in the present exemplary embodiment, the displacement detecting apparatus has the rough rotational displacement signal conversion processing unit 905 and the absolute rotational displacement processing unit 906 provided as is illustrated in FIG. 4, combines the fine rotational displacement signal I with the total light quantity signal T, and thereby can detect the displacement as the absolute quantity.

Figure 9:
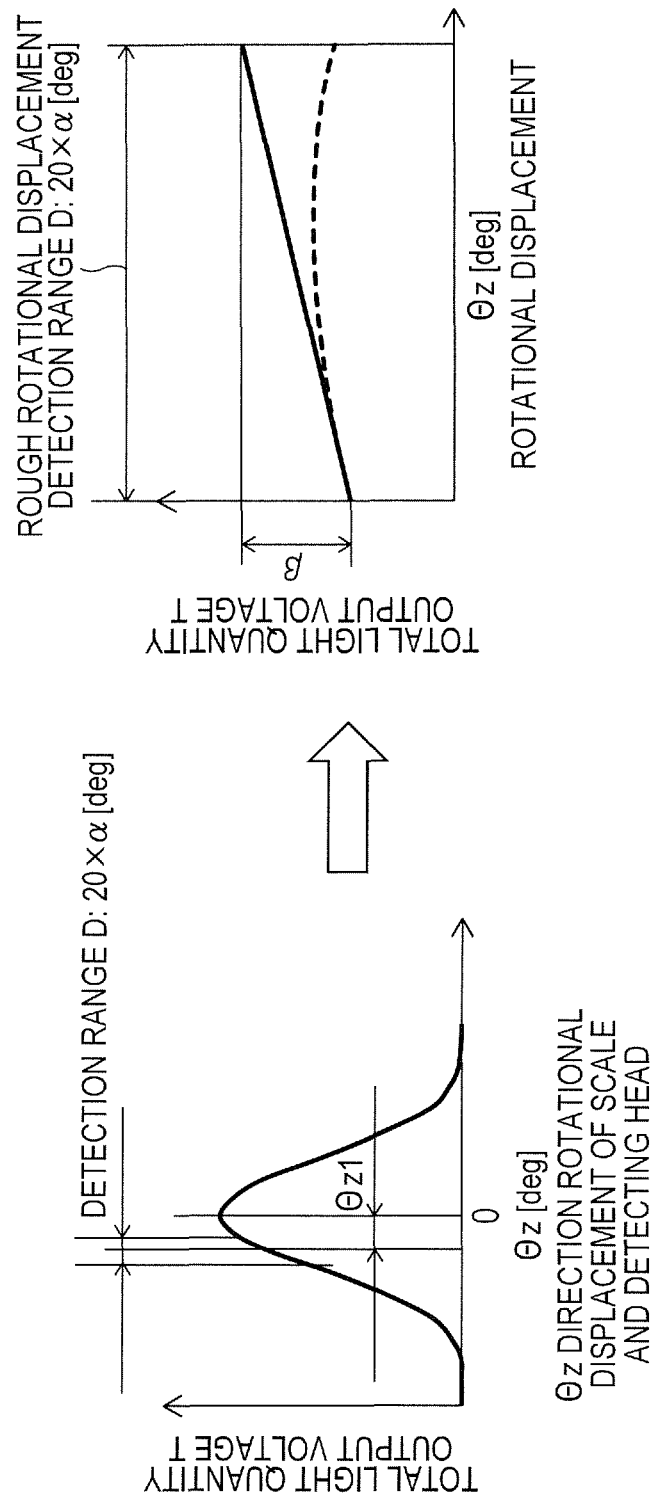
FIG. 9 is an explanatory view illustrating signal processing of a rough rotational displacement signal in the control system in FIG. 4.

In the present exemplary embodiment, when the direction of the lattice pattern 14 of the scale 3 inclines by Δθz in the θz direction against the direction of the index lattice pattern 11 of the detecting head 1 and the direction in which the light-receiving element array 12 is arrayed, the total light quantity signal T changes as is illustrated in the left side of FIG. 9.

In the displacement detecting apparatus of the present exemplary embodiment, when the fixed member 6 and the elastic body 7 relatively rotate while regarding the rotary axis 5 as the center, the scale 3 moves by ΔX in the X-axis direction with respect to the detecting head 1, and rotates by Δθz in a rotation direction around the Z-axis, specifically, in the θz direction. At this time, the scale 3 inclines by Δθz against the detecting head 1, and thereby the total light quantity signal T changes. This originates in that (image of) the scale 3 becomes partially cut off from the light-receiving element array 12 along with the rotation of the scale 3. Incidentally, when the scale 3 is not inclined at the initial position in the middle as is illustrated in FIG. 1A and FIG. 6, the total light quantity signal T changes as is illustrated by a dashed line in the right side of FIG. 9.

This total light quantity signal T has detection sensitivity lower than that of the incremental displacement signal I, but can detect a large (rough) rotational displacement. In addition, as the value of the total light quantity signal T decreases, in response to the decrease, the detection resolution of the incremental displacement signal results in lowering.

Accordingly, such a structure is desirable that the output voltage of the total light quantity signal T is large over the whole detection range of the rough rotational displacement (whole rotation range of scale 3), and that the inclination of the total light quantity signal T with respect to the relative angle θz between the scale 3 and the detecting head 1 is large.

In addition, such a structure is desirable that the total light quantity signal T changes so as to (approximately monotonically) increase (or decrease) from one end to the other end in the whole detection range of the rough rotational displacement (whole rotation range of scale 3). For instance, when the scale 3 is not inclined at the initial position in the middle as is illustrated in FIG. 1A and FIG. 6, the total light quantity signal T changes so as to be approximately symmetrical while regarding the initial position in the middle as the center, as is illustrated by the dashed line in the right side of FIG. 9. Because of this, when the scale 3 is not inclined at the initial position, the displacement detecting apparatus cannot directly read out the rough rotational displacement as the absolute quantity, from the voltage value of the total light quantity signal T.

For this reason, in the present exemplary embodiment, the scale 3 is arranged so as to be inclined only by the above described θz1 against the detecting head 1, at the initial position in the middle, as is illustrated in detail in FIG. 6. Thereby, when the scale 3 has rotated counterclockwise as in FIG. 6 to FIG. 7, (image of) the scale 3 becomes partially cut off from the light-receiving element array 12, and accordingly the total light quantity signal T decreases (as left half of solid line in right side of FIG. 9). On the other hand, in the case where the scale 3 has rotated clockwise from the initial position in FIG. 6, the change corresponds to a change toward a direction in which the direction of the lattice arrangement of the scale 3 (image) matches the direction of the lattice arrangement of the light-receiving element array 12. Because of this, the total light quantity signal T increases (as right half of solid line in right hand of FIG. 9).

Specifically, in the present exemplary embodiment, the scale 3 is inclined against the detecting head 1, at the initial position in the middle. Due to this arrangement, the total light quantity signal T changes so as to (approximately monotonically) increase (or decrease) from one end to the other end in the whole detection range of the rough rotational displacement (whole rotation range of scale 3), as is illustrated by the solid line in the right side of FIG. 9. In addition, the change of the voltage of the total light quantity signal T with respect to the rotation quantity of the scale 3 becomes larger than the change of the case where the scale 3 is not inclined, which is illustrated by a dashed line. Specifically, the inclination of the total light quantity signal T with respect to the relative angle θz between the scale 3 and the detecting head 1 becomes large.

According to the present exemplary embodiment, the displacement detecting apparatus can generate the total light quantity signal T which largely changes so as to (approximately monotonically) increase (or decrease) over the whole displacement detectable range, as is illustrated in the right side in FIG. 9. The displacement detecting apparatus can output a measured value which corresponds to the rotational displacement, as the absolute quantity with high precision, by combining (interpolating) the incremental displacement signal I with (in) the total light quantity signal T.

The rough rotational displacement signal conversion processing unit 905 in FIG. 4 generates the rough rotational displacement signal in the detectable range D, from the above described total light quantity signal T. On the other hand, the incremental displacement signal I which the fine rotational displacement signal conversion processing unit 904 outputs shows values which are periodic with respect to the rotational displacement, in the detectable range of FIGS. 3A and 3B (FIG. 8). This incremental displacement signal I can detect the fine rotational displacement, but a plurality of points of the rotational displacement result in corresponding to a certain value of the incremental displacement signal I, which is natural because the signal I is periodic. On the other hand, the value of the total light quantity signal T determines the rotational displacement in a one-to-one relationship, in the detectable range in FIG. 9, due to the above described inclination arrangement of the scale 3. Because of this, the total light quantity signal T can detect the rough rotational displacement in the wide range.

Here, in the present exemplary embodiment, the detection range D of the rough rotational displacement is set at 0.08°, for instance, and the range β of the total light quantity signal T at this time (FIG. 9) shall correspond to approximately 0.2 V. In addition, the detectable range α of the fine rotational displacement is set at 0.004°, and the range of the incremental displacement signal I at this time is set at 0.8 V. In addition, the detection resolution of the fine rotational displacement at this time is set at approximately 0.000001°, for instance.

The absolute rotational displacement processing unit 906 performs signal processing of interpolating the fine rotational displacement signal in the above described rough rotational displacement signal to generate the absolute rotational displacement, and outputs the result. Thus, according to the present exemplary embodiment, by combining the rough rotational displacement of the wide range with the fine rotational displacement of the fine range and the high resolution, the displacement detecting apparatus can always detect the absolute rotational displacement, without needing the zero point adjustment even when a crash or the like has occurred.

In the above described way, according to the present exemplary embodiment, the displacement detecting apparatus can always detect the absolute rotational displacement always by one pair of the detecting head 1 and the scale 3, without needing the zero point adjustment. Specifically, the displacement detecting apparatus according to the present exemplary embodiment can always detect an absolute displacement of a high resolution, with a simple structure which uses an optical linear encoder that is structured of the detecting head 1 and the scale 3. Incidentally, in the above description, the structure has been mainly shown in which the direction (of lattice arrangement of lattice pattern 14) of the scale 3 inclines against the tangential direction of the relative rotational displacement between the scale 3 and the detecting head 1. However, in order that the displacement detecting apparatus outputs the total light quantity signal T as illustrated in the right side of FIG. 9, instead of the lattice arrangement of the scale 3 as has been described above, the lattice arrangement of the light-receiving element array 12 may incline against the tangential direction of the above described relative rotational displacement. Alternatively, the displacement detecting apparatus may incline both of the lattice arrangements of these scale 3 and detecting head 1. If both of the lattice arrangements are inclined, the inclination angles thereof can be set in opposite directions around the Z-axis (FIGS. 1A and 1B, and FIGS. 5A to 5D), respectively.

In addition, in the above described FIGS. 5A to 5D, the reflection-type optical linear encoder has been illustrated, but this structure may be replaced by a transmission-type optical linear encoder. In this case, the arrangement of the illumination light source and the optical pattern of the scale are changed to such a pattern as to change the transmitted light instead of the reflected light, and thereby the structure can be changed to a structure which uses the transmission-type optical linear encoder. In addition, in the present exemplary embodiment, an optical linear encoder is supposed which detects the displacement by using interference light that is generated by a light-receiving element array having a fine staggered arrangement of the A-phase and the B-phase (or three or more phases), but also in the case of the optical linear encoder which uses non-interference light, the arrangement similar to the above description can be achieved.

In addition, as in the previously described FIG. 3A, the incremental displacement signal in the present exemplary embodiment shows a periodic change with an approximately saw-tooth appearance over the whole detectable range D, and shows a periodic value with respect to the relative rotational displacement θz between the detecting head 1 and the scale 3. The incremental displacement signal shows a relationship of a linear function with respect to the relative rotational displacement θz between the detecting head 1 the scale 3, within the range of the period α (°). Furthermore, in the present specification, in order to facilitate understanding, it has been described previously that the waveforms of the plurality (20 pieces in illustrated example) of incremental displacement signals in the detectable range D also similarly show a relationship of a linear function with respect to the rotational displacement θz, within the range of the period α (°).

Figure 17A:
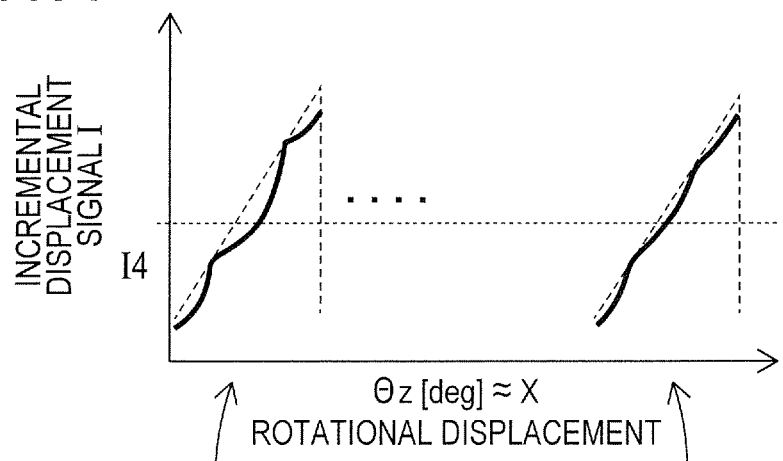
FIGS. 17A and 17B are views illustrating an error which occurs in an incremental displacement signal in Exemplary Embodiment 1 of the present invention.
Figure 17B:
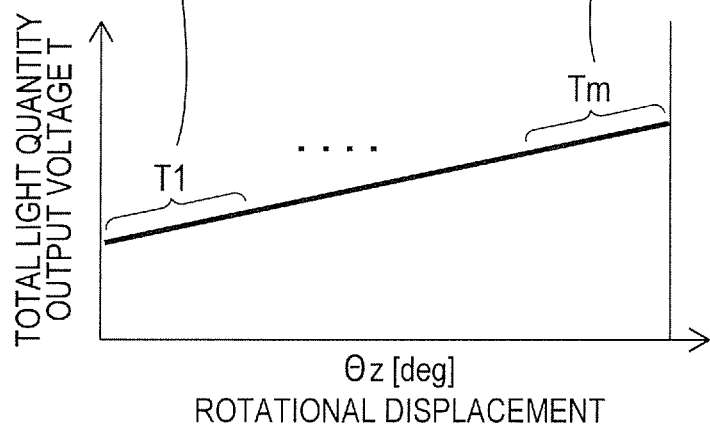

However, actually, there is the case where the incremental displacement signal does not show a relationship of a strictly linear function with respect to the rotational displacement θz. The detail will be described below with reference to FIGS. 17A and 17B. As the detecting head 1 and the scale 3 relatively incline, the total light quantity output voltage decreases from Tm to T1, as is illustrated in FIG. 17B. When the total light quantity output voltage decreases from Tm to T1, as is illustrated in FIG. 17A, the incremental displacement signal gradually becomes distant from the relationship of the strict linear function (illustrated in dotted line in figure) with respect to the rotational displacement θz. In this case, if a simple linear coefficient is used when the incremental displacement signal is converted into the rotational displacement θz, an error at the time of conversion becomes large, as the total light quantity output voltage becomes low.

Figure 18:
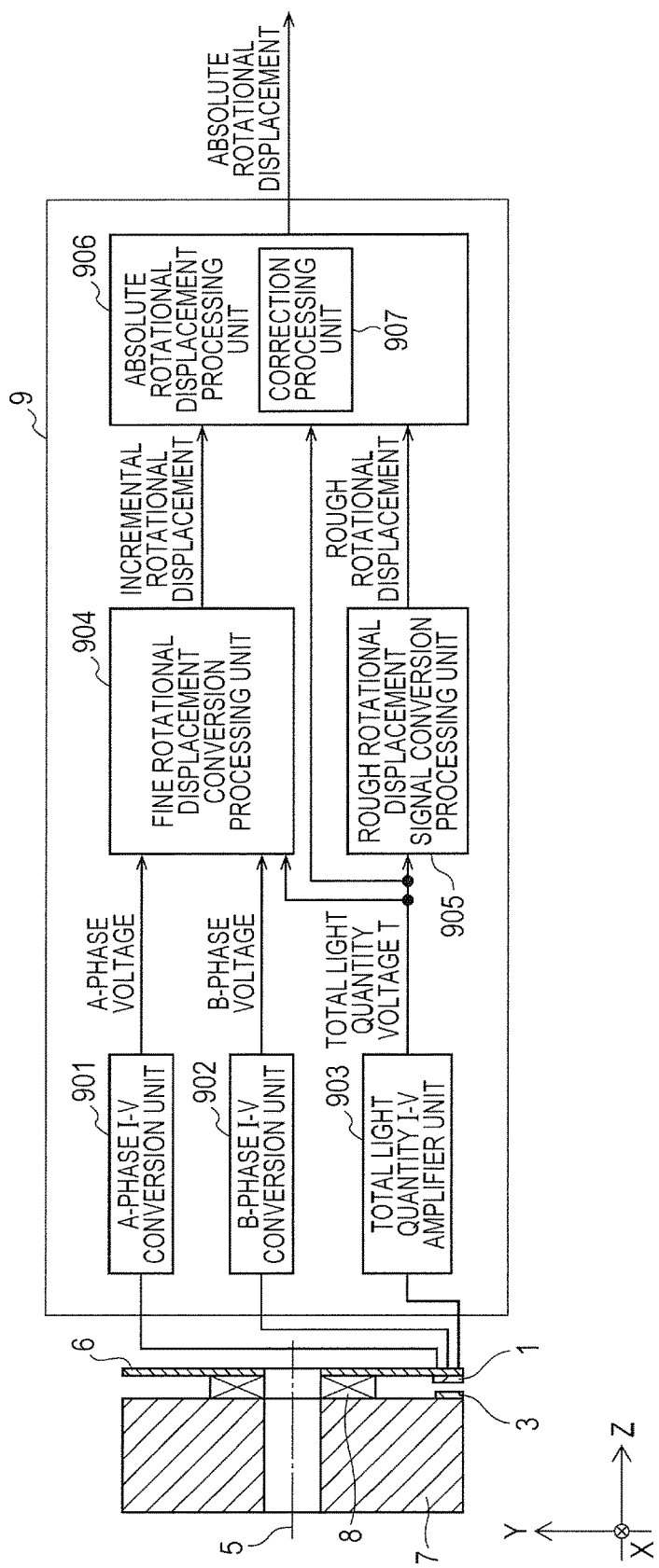
FIG. 18 is a block diagram illustrating a configuration of a control system of the displacement detecting apparatus including correction processing of an incremental rotational displacement signal, in Exemplary Embodiment 1 of the present invention.

For this reason, in the present exemplary embodiment, the absolute rotational displacement processing unit 906 has a correction processing unit 907 for correcting the incremental displacement signal I which has been generated in the fine rotational displacement signal conversion processing unit 904, as in FIG. 18.

A specific correction method will be described below with reference to FIGS. 19A and 19B. The incremental displacement signal I which has been generated in the fine rotational displacement signal conversion processing unit 904 is converted into the absolute rotational displacement, with reference to the correction data table 908 which exists in the correction processing unit 907 in the absolute rotational displacement processing unit 906. The correction data table 908 describes the quantity of the rough rotational displacement (or inclination angle of scale 3) of the linear encoder (detecting head 1 and scale 3), or the correction value of the incremental displacement signal (I) which corresponds to the total light quantity output voltage (T), therein. When the incremental signal is I4, and the total light quantity output voltage is T1, the corrected absolute rotational displacement becomes $\theta_{ZT1}$ (4) with reference to the inside of the correction data table 908. As has been described above, as a result of the correction by the correction data table 908, the displacement detecting apparatus can generate the strict absolute rotational displacement.

In addition, the correction method using a correction function will be described below with reference to FIGS. 20A to 20C. The incremental displacement signal I shows a saw-like waveform in which one period of the A-phase signal and the B-phase signal of the linear encoder correspond to one crest, as is illustrated in FIG. 20A. However, actually, when the detecting head 1 and the scale 3 relatively incline, an error ΔI occurs that is a cosine wave of which one saw-tooth-like wave corresponds to two periods, in the incremental displacement signal (I), as is illustrated in FIG. 20B. For this reason, in the present exemplary embodiment, when the incremental displacement signal is represented by (I), the absolute rotational displacement is represented by θz, the angle obtained after one period of the A-phase signal and the B-phase signal of the linear encoder has been converted into the absolute rotational displacement is represented by α, and the coefficient is represented by $\beta_{Tm}$, the correction processing unit corrects the incremental displacement signal (I) as Expression (2), for instance.

$$\theta z = I - \beta_{Tm} \times \{\cos(2 \times I \times 360/\alpha) + 1\} \quad (2)$$

The coefficient $\beta_{Tm}$ in Expression (2) is a coefficient which is determined by a value of the total light quantity output voltage T, and is determined beforehand, as in FIG. 21. As in the above description, as a result of the correction using the correction function, the correction processing unit can generate the strict absolute rotational displacement.

Example 2

In the structure which has been described above, the direction (of lattice arrangement of lattice pattern 14) of the scale 3 or (lattice arrangement of) the light-receiving element array 12 is inclined against the tangential direction of the relative rotational displacement between the scale 3 and the detecting head 1, at the initial position of the relative rotational displacement.

This direction (of lattice arrangement of lattice pattern 14) of the scale 3 or the inclination angle (of lattice arrangement) of the light-receiving element array 12 can be configured so as to be adjusted according to the design specification of the displacement detecting apparatus, for instance, the setting of the detection range of the fine rotational displacement and/or the rough rotational displacement, and the like. Specifically, an adjusting unit is provided which adjusts an inclination angle at which the direction of the optical pattern of the scale 3 or the lattice arrangement of the light-receiving element array 12 inclines against the tangential direction of the relative rotational displacement between both of the scale 3 and the lattice arrangement.

This adjusting unit is structured, for instance, of the following rotation mechanism 19. This rotation mechanism 19 includes, for instance, a rotationally supporting mechanism (unillustrated) for rotationally supporting the center of the scale 3 (or light-receiving element array 12) on the rotary shaft. Furthermore, the rotation mechanism 19 includes such a rotation position fixing unit (unillustrated) as to fix the rotation position of the scale 3 (light-receiving element array 12) by using a stopper screw, a ratchet pawl or the like.

Incidentally, the rotation mechanism 19 may have such a structure as to have the rotary shaft which is connected to the center of the scale 3 (or light-receiving element array 12), and as to actively rotate this rotary shaft through a motor, a gear box for reduction, or the like. The rotation mechanism 19 which can actively control the inclination angle by the motor or the like can be controlled by a controlling apparatus (for instance, CPU in controlling unit of robot apparatus which will be described later, and the like). In this case, the controlling apparatus can determine the inclination angle of the scale 3 (or light-receiving element array 12) through the rotation mechanism 19, according to the displacement measurement specification and/or the driving conditions of the whole of the apparatus.

Figure 10:
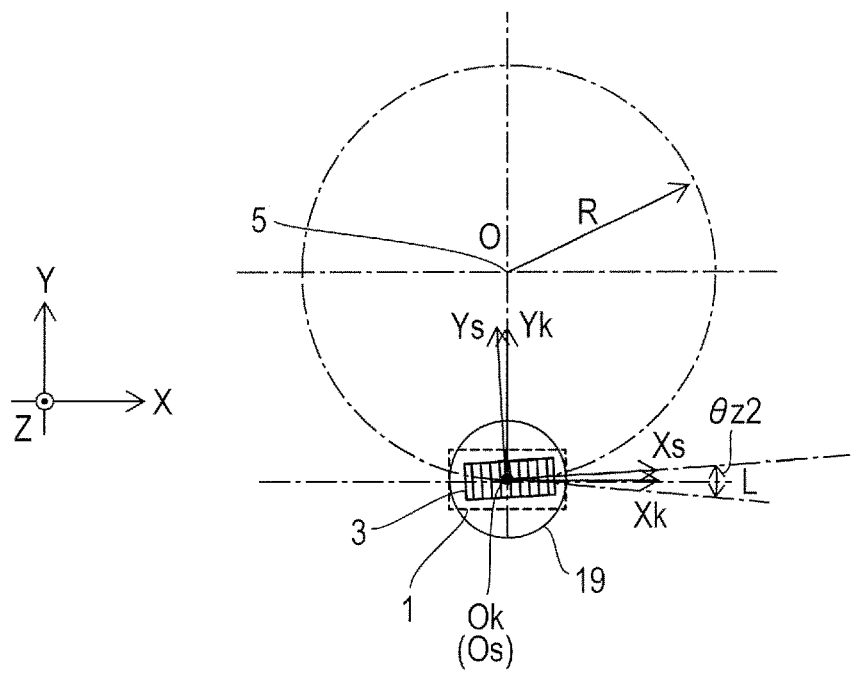
FIG. 10 is a front view illustrating a positional relationship between a scale and a detecting head in a displacement detecting apparatus in Exemplary Embodiment 2 of the present invention.
Figure 11:
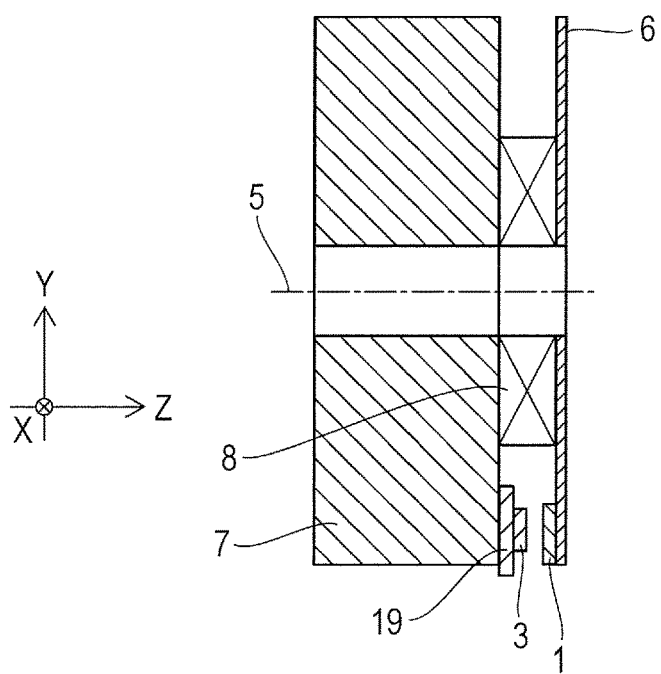
FIG. 11 is a side view illustrating a structure of the displacement detecting apparatus in Exemplary Embodiment 2 of the present invention.

The displacement detecting apparatus having the rotation mechanism 19 can be structured as in FIG. 10 and FIG. 11. FIG. 10 illustrates the center of the rotation of the elastic body 7 and a positional relationship between the scale 3 and the detecting head 1, in the displacement detecting apparatus (torque sensor) of the present exemplary embodiment, from the Z-axis direction. FIG. 11 illustrates a structure of an encoder portion (corresponding to encoder portion in FIG. 4) of the displacement detecting apparatus (torque sensor) of the present exemplary embodiment, from the side direction. Parts except for the structure of the displacement detecting apparatus illustrated in FIG. 10 and FIG. 11 can be structured similarly to those in the above described Exemplary Embodiment 1.

As is illustrated in FIG. 11, the scale 3 is fixed to the elastic body 7 through the rotation mechanism 19, and the rotation mechanism 19 can adjust the angle ($\theta z$) at which the scale 3 inclines against the tangential direction of the relative rotational displacement between the scale 3 and the detecting head 1. The rotation mechanism 19 shall be, for instance, the above described adjusting unit which uses the rotary shaft, the stopper screw, the ratchet pawl and the like. In the present exemplary embodiment, this rotation mechanism 19 shall be configured so as to be capable of adjusting the angle $\theta z2$ between the Xs-axis of the scale 3 and the Xk-axis of the detecting head 1, within $\pm 0.5°$.

In the present exemplary embodiment, by being structured as in the above, the adjusting unit can change the detection range D of the rough rotational displacement (FIG. 9) of the displacement detecting apparatus. Thereby, the displacement detecting apparatus can select and determine appropriate detection conditions according to the displacement (torque) measurement condition and the specification. For instance, when it is acceptable to enhance the detection resolution of the fine rotational displacement of the elastic body 7 and narrow the detection range of the rough rotational displacement, the displacement detecting apparatus can perform such an adjustment as to set the angle $\theta z2$ at about 0.1°. In addition, when lowering the detection resolution of the fine rotational displacement, and widening the detection range of the rough rotational displacement, the displacement detecting apparatus can perform such an adjustment as to set the angle $\theta z2$ at 0.2° or more. Thus, the displacement detecting apparatus can select, for instance, the detection range of the rough rotational displacement and the range in which the total light quantity signal (T) changes, according to the measurement condition required to the displacement detecting apparatus, and can set desired conditions of the displacement measurement (or torque detection).

Example 3

In the above described Exemplary Embodiment 1 (also in Exemplary Embodiment 2 similarly), the scale 3 and the light-receiving element array 12 of the detecting head 1 are arranged in parallel to the XY plane in FIG. 1A, FIG. 6 and FIG. 7. In addition, the surface of the elastic body 7 which is a body of rotation and mounts the scale 3 thereon also becomes parallel to the XY plane. However, in order that the displacement detecting apparatus detects the rotational displacement, it is sufficient if the scale 3 and the light-receiving element array (12) of the detecting head 1 are relatively and rotationally displaced, and these members do not necessarily need to be arranged in parallel to the XY plane (or to elastic body 7 which is body of rotation).

Figure 12:
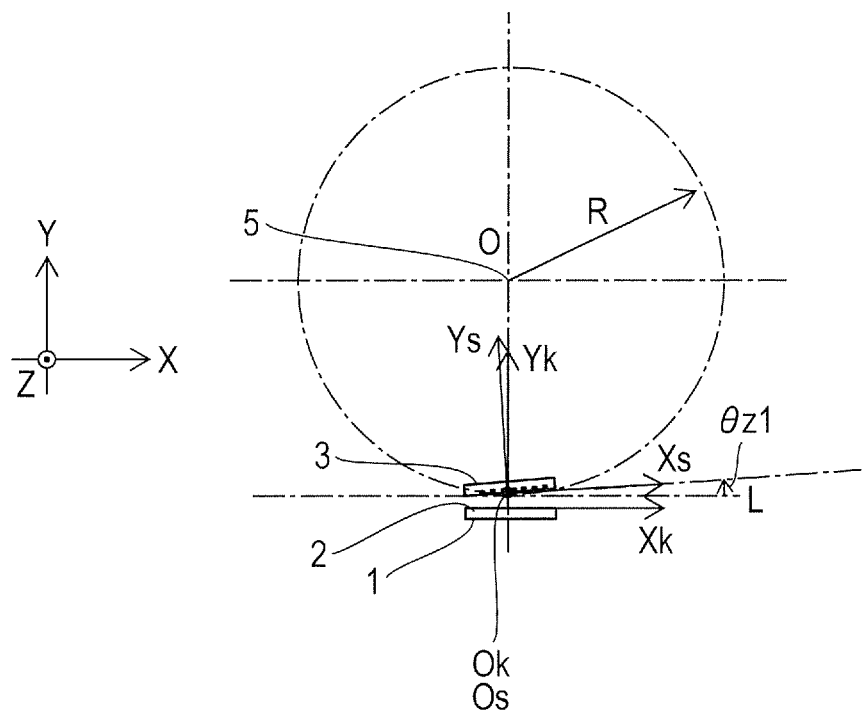
FIG. 12 is a front view illustrating a positional relationship between a scale and a detecting head in a displacement detecting apparatus in Exemplary Embodiment 3 of the present invention.

For instance, as is illustrated in FIG. 12 which is illustration similar to FIG. 1A, FIG. 6 and FIG. 7, the detecting head 1 (light-receiving element array 12) is arranged so as to be orthogonal to (or intersect with) the XY plane, and the scale 3 is arranged on the elastic body 7 which is the body of the rotation, so as to face the detecting head 1. Then, the detecting head 1 and the scale 3 are relatively and rotationally displaced. Here, each of the structures of the scale 3 and (or) the detecting head 1 shall be similar to that in FIG. 4 (except for illustration concerning arrangement direction), also in the present exemplary embodiment.

Also by having such a structure, the displacement detecting apparatus can relatively and rotationally displace the scale 3 and the light-receiving element array (12) of the detecting head 1, and detect the rotational displacement of the body of the rotation (elastic body 7). Also in this case, the structure is basic in which the scale 3 and (or) (lattice arrangement of light-receiving element array 12 of) the detecting head 1 are not inclined against the tangential direction of the relative rotational displacement between both of the scale 3 and the detecting head 1. Also in this basic structure, the total light quantity signal (T) which is used in the present invention changes due to the variation of the distance between the scale 3 and the light-receiving element array (12) of the detecting head 1, and accordingly the total light quantity signal (T) can be used as the quantity of the rough rotational displacement.

However, in the basic structure in which the scale 3 is not inclined at the initial position in the middle in the arrangement of the scale 3 and the detecting head 1 in FIG. 12, the total light quantity signal (T) does not monotonically increase (or decrease), but becomes bilaterally symmetric with respect to the center which is the initial position in the middle. Because of this, it is necessary to distinguish, for instance, whether the relative rotational displacement between the scale 3 and the detecting head 1 is clockwise rotation or counterclockwise rotation from the initial position in the middle, by any method.

Incidentally, in the arrangement of the scale 3 and the detecting head 1 in FIG. 12, the change of the total light quantity signal (T) does not occur due to such a cause that (image of lattice pattern 14) of the scale 3 becomes partially cut off from the light-receiving surface of the light-receiving element array (12). In other words, in the arrangement of the scale 3 and the detecting head 1 in FIG. 12, the change occurs due to the variation of the irradiation distance of the illumination light of the light-emitting element 10 in the detecting head 1. In particular, in the basic structure in which the scale 3 and the light-receiving element array (12) of the detecting head 1 are parallel to each other at the initial position in the middle, the irradiation distance varies so as to increase in one end of the scale 3 and decreases in the other end by the same distance. Because of the way of variation, the total light quantity signal (T) does not monotonically increase (or decrease) but becomes symmetric with respect to the center which is the initial position in the middle.

For this reason, also in the structure in which the scale 3 and the detecting head 1 are arranged so as to intersect with the XY plane as is illustrated in FIG. 12, the inclination arrangement of the scale 3 or (and) detecting head 1 is effective, in order that the displacement detecting apparatus acquires the suitable total light quantity signal (T). For instance, any one of the scale 3 and the detecting head 1 is arranged at the initial position in the middle, so as to incline against a tangential direction of the relative rotational displacement between both of the scale 3 and the detecting head 1. In addition, if both of the scale 3 and the detecting head 1 are inclined, these inclination angles can be set in opposite directions to each other around the Z-axis (axis in parallel to Z-axis), respectively.

FIG. 12 illustrates an example in which the scale 3 is arranged so as to incline against the above described tangential direction of the relative rotational displacement, at the initial position in the middle, among the above described inclination arrangements. Specifically, the Xs-axis of the optical pattern (lattice pattern 14) of the scale 3 is inclined against the tangential direction (L) of the relative rotational displacement between the scale 3 and the detecting head 1 only by $\theta z1$, at the initial position in the middle. Alternatively, the Xs-axis and the Ys-axis of the optical pattern (lattice pattern 14) of the scale 3 are inclined against the Xk-axis and the Yk-axis of the detecting head only by the angle $\theta z1$.

According to such an arrangement, when the scale 3 rotates counterclockwise, the inclination angle between the scale 3 and (lattice arrangement of) the light-receiving element array 12 of the detecting head 1 becomes larger, and the irradiation distance of the illumination light and the reflected light with respect to (lattice pattern 14 of) the scale 3 becomes large. In addition, when the scale 3 rotates clockwise, conversely, the scale 3 and (lattice arrangement of) the light-receiving element array 12 of the detecting head 1 become gradually parallel to each other, and the irradiation distance of the illumination light and the reflected light with respect to (lattice pattern 14 of) the scale 3 becomes small.

Because of this, the displacement detecting apparatus can make the total light quantity signal (T) which has been acquired from (all of elements of light-receiving element array 12 of) the detecting head 1 change so as to approximately monotonically increase (or decrease) from one end to the other end of the detectable range (as is illustrated in FIG. 3B or in right side of FIG. 9). As has been described above, the displacement detecting apparatus can make the total light quantity signal (T) change so as to approximately monotonically increase (or decrease) from one end to the other end, over the whole detection range of the rotational displacement.

On the other hand, the incremental displacement signal (I) can obtain a signal (for instance, FIG. 8) which is equivalent to that in the above described Exemplary Embodiment 1, except that the scale 3 and the lattice arrangement of the detecting head 1 are parallel to each other. This incremental displacement signal (I) can correspond to the fine rotational displacement quantity, similarly as in the above described exemplary embodiments. In addition, the total light quantity signal T can correspond to the rough rotational displacement quantity, which changes so as to monotonically increase (or decrease) from one end to the other end over the whole detection range of the rotational displacement, as has been described above. In addition, by combining the rough rotational displacement quantity with the fine rotational displacement quantity, specifically, by interpolating the fine rotational displacement quantity in the rough rotational displacement quantity, the displacement detecting apparatus can detect the quantity of the relative displacement between the detecting head 1 and the scale 3, as the absolute quantity, without depending on the zero point adjustment. In other words, by combining the rough rotational displacement of the wide range with the fine rotational displacement of the fine range and the high resolution, the displacement detecting apparatus is enabled to always detect the absolute rotational displacement, similarly as in the above described exemplary embodiments.

Example 4

In each of the above described exemplary embodiments, and particularly in Exemplary Embodiment 1, the structure of the torque sensor has been already described in which the body of the rotation that mounts the scale 3 thereon is the elastic body 7. In the present exemplary embodiment, a more detailed configuration example of the torque sensor which uses the displacement detecting apparatus that adopts the present invention will be further described below with reference to FIG. 13 and FIG. 14.

Figure 13:
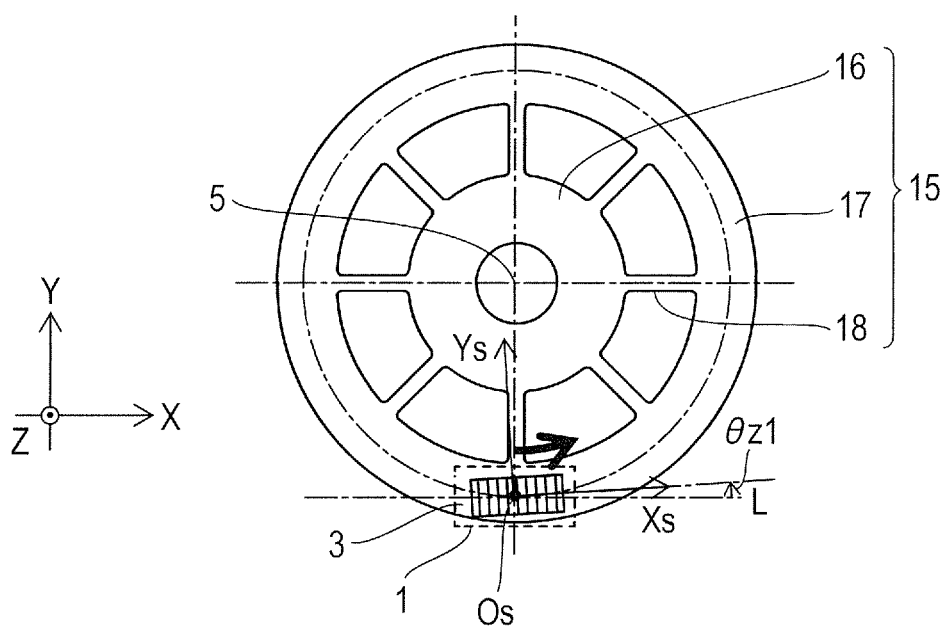
FIG. 13 is a front view illustrating a structure of a torque sensor which uses a displacement detecting apparatus in Exemplary Embodiment 4 of the present invention.

In FIG. 13, the center (Os) of the scale 3 is mounted on the circumference shown by a dashed dotted line, of an elastic body 15 (that corresponds to the above described elastic body 7) which acts as a body of rotation. In addition, the Xs-axis of the scale 3 is inclined against the tangential direction (L) of the relative rotational displacement between the scale 3 and the detecting head 1, by the angle $\theta z1$, at the initial position in the middle, similarly to the above description. This inclination arrangement is similar to that illustrated in FIG. 1A, FIG. 6 and the like.

The elastic body 15 is structured of an elastic inner ring 16, an elastic outer ring 17, and an elastic hinge 18 that has a spoke shape and connects the inner and outer rings to each other at positions by which the circumference is equally divided into eight. The elastic body 15 is manufactured from a material, for instance, of a resin, a metal or the like having such an elastic coefficient (torsional rigidity) as to suit the detectable range for the torque, by being integrally molded into a shape which has each part of the elastic inner ring 16, the elastic outer ring 17 and the elastic hinge 18. The elastic outer ring 17 of the elastic body 15 is connected to the elastic inner ring 16 through the elastic hinges 18, and finely rotates in the $\theta z$ direction against the elastic inner ring 16 while regarding the rotary axis 5 as the center, when the torque of torsionally deforming the elastic outer ring 17 is applied from the outside. Specifically, when the elastic outer ring 17 has received the torque applied around the z-axis from the outside, the elastic hinges 18 are elastically deformed in the θz rotation direction while regarding the rotary axis 5 as the center. At this time, the torque sensor can detect the torque which is applied to the elastic body 15, based on the rotation quantity of the elastic outer ring 17, which has been measured through the relative rotational displacement between the detecting head 1 and the scale 3, and on the elastic coefficient particularly of the portion of the elastic hinge 18.

Figure 14:
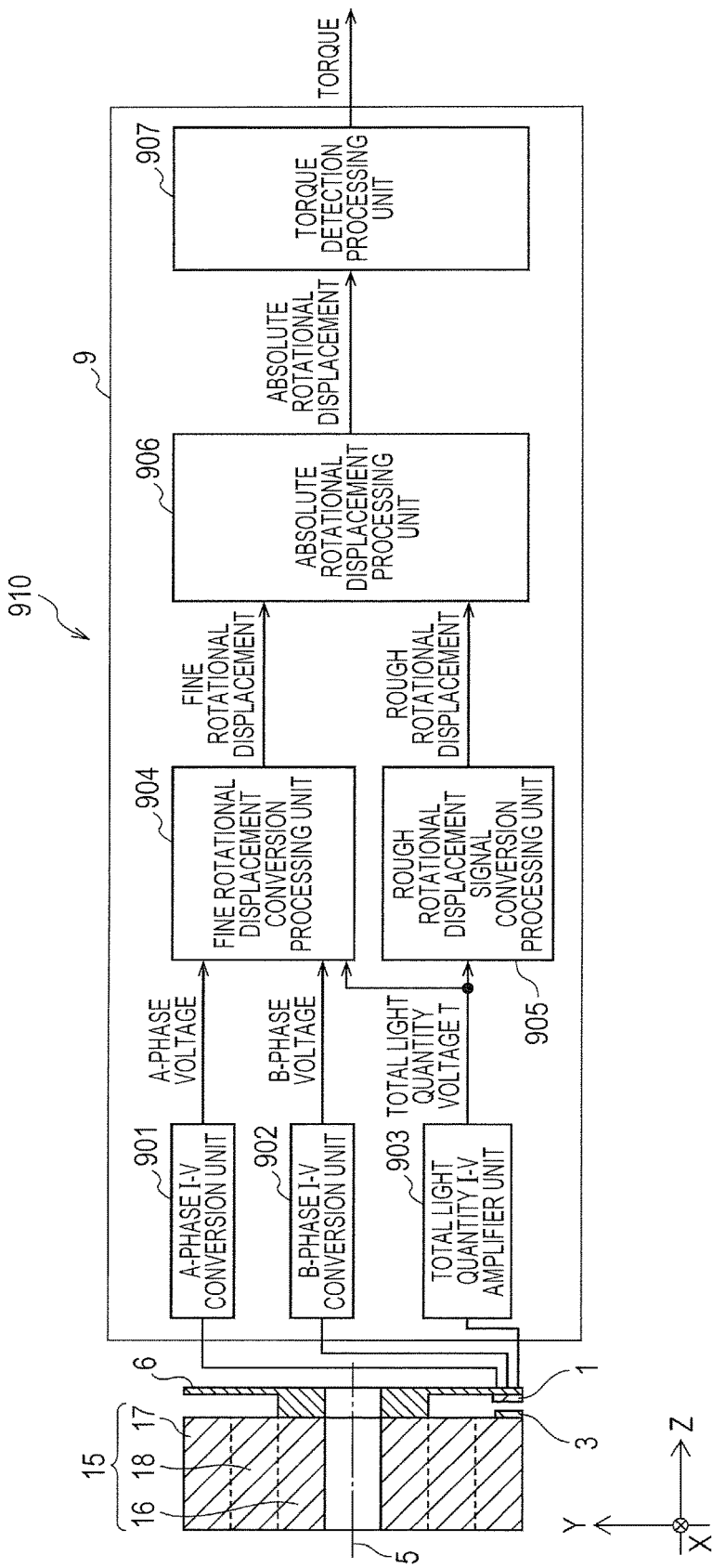
FIG. 14 is a block diagram illustrating a configuration of a control system of the torque sensor which uses the displacement detecting apparatus in Exemplary Embodiment 4 of the present invention.

FIG. 14 illustrates the configuration of a torque detecting apparatus 910 that uses the displacement detecting apparatus of the present exemplary embodiment, which includes a configuration of the control system, in a form equivalent to that in FIG. 4. In FIG. 14, the members which are same as or equivalent to those in FIG. 4 are designated by the same characters, and the detailed description will be omitted.

The points at which FIG. 14 is different from FIG. 4 are such points that the elastic body 7 in FIG. 4 is replaced with the elastic body 15 in FIG. 13, and that a torque calculation processing unit 907 is arranged in the rear stage of the absolute rotational displacement processing unit 906. The torque calculation processing unit 907 can be realized, for instance, by a configuration of making a CPU which is structured of a general-purpose microprocessor and the like execute a computation program as is expressed by a following Expression (3).

In addition, the configuration from the A-phase I-V conversion unit 901, the B-phase I-V conversion unit 902, and the total light quantity I-V conversion unit 903 to the absolute rotational displacement processing unit 906 in the torque detecting apparatus 910 in FIG. 14 is similar to that in FIG. 4. The absolute rotational displacement processing unit 906 in FIG. 14 outputs the rotational displacement on the circumference of the elastic body 15, on which the scale 3 is arranged, as the absolute quantity (absolute rotational displacement (Δθz)), in the similar way to that described in Exemplary Embodiment 1.

The torque calculation processing unit 907 performs such computation as to be expressed by the following Expression (3), based on the absolute rotational displacement (Δθz) which the absolute rotational displacement processing unit 906 outputs, and the torsional rigidity kz in the rotation direction of the elastic body, and thereby can calculate a torque value Tz.

$$Tz = kz \times \Delta\theta z \quad (3)$$

In the above described way, the torque detecting apparatus 910 (FIG. 13 and FIG. 14) in the present exemplary embodiment can always detect the absolute value of the torque with high resolution. Also in the present exemplary embodiment, the scale 3 is inclined against the tangential direction of the relative rotational displacement between the scale 3 and the detecting head 1, at the initial position in the middle, as has been described above. Because of this, the torque detecting apparatus can make the total light quantity signal (T) which has been acquired from (all of elements of light-receiving element array 12 of) the detecting head 1 change so as to approximately monotonically increase (or decrease) from one end to the other end of the detectable range (as is illustrated in FIG. 3B or right side of FIG. 9). The torque detecting apparatus can make this total light quantity signal (T) correspond to the rough rotational displacement quantity. In addition, similarly as in the above described exemplary embodiments, the torque detecting apparatus can make the incremental displacement signal (I) correspond to the fine rotational displacement quantity, similarly as in the above described exemplary embodiments. In addition, by combining the rough rotational displacement quantity with the fine rotational displacement quantity, specifically, by interpolating the fine rotational displacement quantity in the rough rotational displacement quantity, the torque detecting apparatus can detect the quantity of the relative displacement between the detecting head 1 and the scale 3, as the absolute quantity, without depending on the zero point adjustment. In other words, similarly as in the above described exemplary embodiments, by combining the rough rotational displacement of a wide range with the fine rotational displacement of a fine range and a high resolution, the torque detecting apparatus is enabled to always detect the absolute rotational displacement.

In addition, as has been described above, the torque detecting apparatus 910 in the present exemplary embodiment shows an excellent effect that the torque detecting apparatus 910 does not miss the absolute rotational displacement of the elastic body 15, and the absolute value of the torque, even when the installed apparatus has caused the crash. Because of this, the torque detecting apparatus 910 shows an excellent effect that even when the installed apparatus has caused the crash, the torque detecting apparatus does not need the zero point adjustment and can operate again without needing a stop or disassembly of the apparatus.

Example 5

The torque detecting apparatus which has been described in Exemplary Embodiments 1 to 4, for instance, the torque detecting apparatus 910 in Exemplary Embodiment 4 (FIG. 13 and FIG. 14), can be used for detecting a driving torque of the joint, by being arranged together with a joint driving mechanism of the robot apparatus.

Figure 15A:
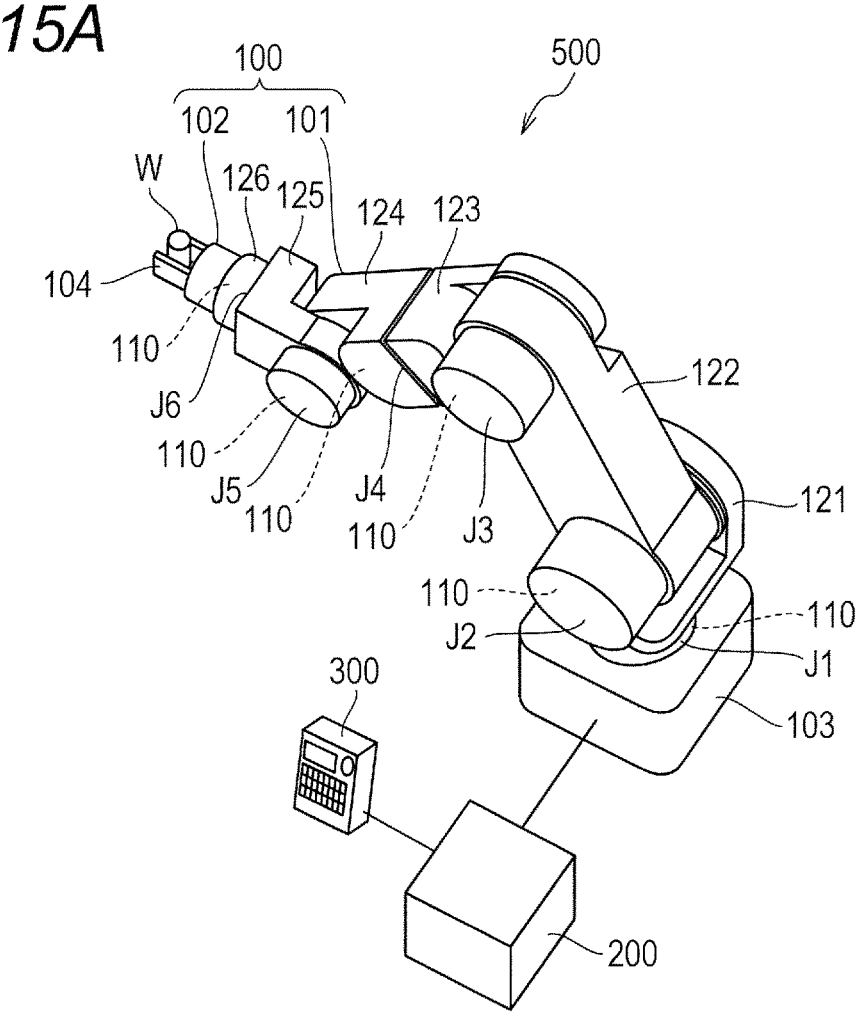
FIGS. 15A and 15B are views illustrating a structure of a robot apparatus which uses a displacement detecting apparatus in Exemplary Embodiment 5 of the present invention.

The structure of the robot apparatus that has the torque sensor mounted thereon which uses the displacement detecting apparatus of the present invention will be described in detail below with reference to FIGS. 15A and 15B and FIG. 16. FIG. 15A illustrates a schematic structure of the robot apparatus that has the torque sensor mounted thereon which uses the displacement detecting apparatus described in the above described Exemplary Embodiment 4.

A robot apparatus 500 illustrated in FIG. 15A is, for instance, an industrial robot. The robot apparatus 500 in FIG. 15A includes: a robot 100 (main body of robot) which performs an operation such as assembly of a work W; a controlling apparatus 200 which controls the robot 100; and a teaching pendant 300 which is connected to the controlling apparatus 200. The robot 100 has a multi-joint robot arm (hereafter referred to as "robot arm") 101, and a robot hand 102 which is an end effector that is connected to the front end of the robot arm 101.

The robot arm 101 in FIG. 15A is a vertical multi-joint type of robot arm, and has a base portion (base-end link) 103 which is fixed to a work bench, and a plurality of links 121 to 126 which transmit displacement or force. The base portion 103 and the plurality of links 121 to 126 are connected to each other so as to be pivotable or rotatable, by a plurality of joints J1 to J6. The robot arm 101 is provided with an unillustrated encoder which detects a rotation angle of the rotating shaft provided on each of the joints J1 to J6, and a driving unit 110 which drives each of the joints J1 to J6.

As for the driving unit 110 which is arranged in each of the joints J1 to J6, a device is used which has such an appropriate output as to suit the size of the necessary torque. In the driving unit 110 of each of the joints J1 to J6 (or of robot hand 102), for instance, the torque detecting apparatus (910) illustrated in Exemplary Embodiment 4 (FIG. 13 and FIG. 14) can be arranged. Then, the torque detecting apparatus (910) detects a driving torque of the joint (or gripping claw of robot hand 102), and the robot apparatus can control the torque, for instance, by feeding the detected torque back to the driving signal of the driving unit 110.

The robot hand 102 has a gripping claw 104 which grips the work W, the driving unit 110 which drives the gripping claw 104, an unillustrated encoder which detects the rotation angle of the driving unit 110, and an unillustrated mechanism which converts the rotation into the gripping operation. The unillustrated mechanism is designed so as to fit a gripping operation necessary with a cam mechanism, a link mechanism and the like. Incidentally, there is the case where the torque necessary for the driving unit 110 which is used in the robot hand 102 is different from the torque necessary for the joint of the robot arm 101, but the basic structures of the driving units 110 are same. In addition, there is the case where an unillustrated force sensor is provided in the robot hand 102, which can detect a stress (reaction force) that acts on the gripping claw 104 and the like.

The teaching pendant 300 is structured so as to be capable of being connected to the controlling apparatus 200, and is structured so as to be capable of transmitting a command for driving and controlling the robot arm 101 and the robot hand 102, to the controlling apparatus 200, when having been connected to the controlling apparatus 200.

Figure 15B:
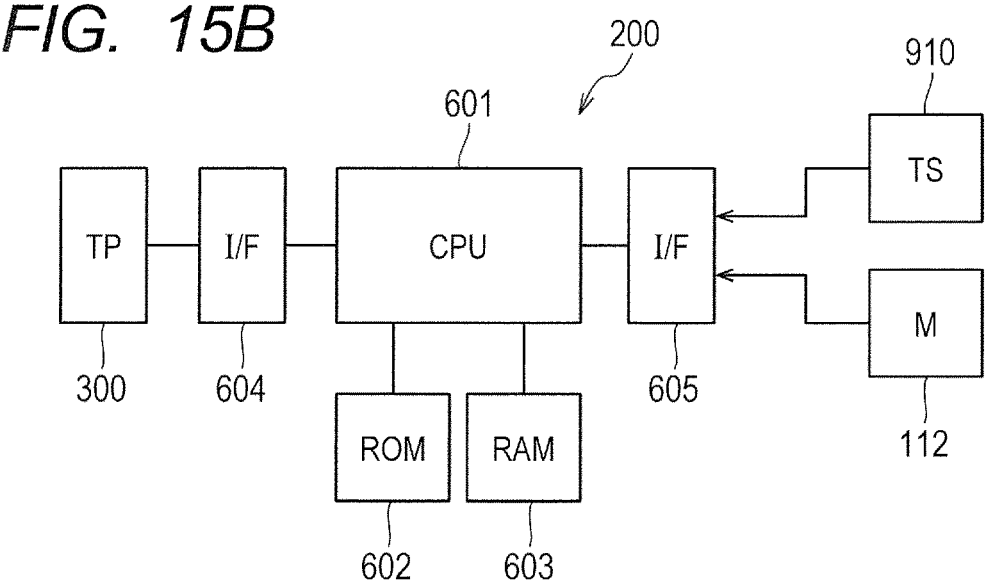

The controlling apparatus 200 is structured of the CPU 601 which is a main part and is formed of a general-purpose microprocessor and the like, as is illustrated in FIG. 15B. In FIG. 15B, the controlling apparatus 200 can be structured, for instance, of the CPU 601, a RAM 603 which temporarily stores data therein, a ROM 602 which stores a robot control program therein for controlling each of the units, and interfaces 604 and 605.

The ROM 602 corresponds to a recording medium which can be read by a computer (CPU 601) that stores a robot control program therein which contains such a torque control as to be described later. The CPU 601 executes the robot control program which is stored, for instance, in the ROM 602, and thereby executes the robot control that contains such a torque control as to be described later. Incidentally, a part of the ROM 602 can be formed of a rewritable non-volatile region such as an E(E)PROM. In this case, the robot control program which has been acquired through the recording medium that can be read out by the computer, such as an unillustrated flash memory and an optical disk, or through a network, can be installed in the above described rewritable nonvolatile region. In addition, the robot control program which is stored in the above described rewritable nonvolatile region can be also updated by the above described recording medium which can be read out by the computer, and by data which has been acquired through the network.

The controlling apparatus 200 supplies a required power which is required for the operation of each of the above described driving units 110, to the driving unit 110 from an unillustrated power source, and thereby executes the robot control of controlling the position and the orientation of each of the units of the robot apparatus 500, particularly of the robot arm 101 and the robot hand 102. In the case, the interface 605 is used for the input/output of the control signal. Incidentally, in FIG. 15B, a motor 112 (FIG. 16) and the torque detecting apparatus 910 are illustrated as structural members of the driving unit 110.

In the above described robot control, the CPU 601 receives the command which has been sent from the teaching pendant 300 through the interface 604, and controls the operation of each of the above described units according to this command. Alternatively, the CPU 601 can also control the operation of each of the above described units according to the content of the robot control program which is supplied from another program terminal or the like, and stored in the RAM 603 or the like. The controlling apparatus 200 operates the driving unit 110 of each of the joints J1 to J6 of the robot arm 101 according to the input setting and the like, and thereby the robot apparatus 500 moves the robot hand 102 to an arbitrary position and orientation. For instance, the robot apparatus 500 controls the drive of the driving unit 110 while making the force sensor detect the stress acting on the gripping claw 104 at the arbitrary position and orientation, makes the robot hand 102 grip the work W, and can perform the operation such as an assembly of the work W.

The torque detecting apparatus 910 can be arranged, particularly in the driving unit 110 which drives the joints J1 to J6 and the robot hand 102, in the following way. Then, based on the driving torque of the driving unit 110, which has been detected through the torque detecting apparatus 910, the CPU 601 executes the robot control of the robot apparatus that is structured of each of the units of the robot arm 101, the robot hand 102 and the like.

The structure example of the driving unit 110 will be described below in FIG. 16, which drives the above described joints J1, J2 and so on (or robot hand 102). However, the driving unit 110 illustrated in FIG. 16 is illustrated as a unit of the joint J2 which drives the link 122 of the robot arm 101, but the driving unit 110 provided on each of the other joints (or robot hand 102) is also structured similarly to that in FIG. 16.

In FIG. 16, the driving unit 110 includes, a motor 112, and a wave motion gear apparatus 111 which reduces the rotation of the rotor (rotating shaft) of the motor 112 and outputs the reduced power. The motor 112 is, for instance, a servomotor which is formed of an AC motor, a brushless DC motor and the like. The link 122 is rotated by the reduced output power of the wave motion gear apparatus 111, and the rotation angle of the link 122 is determined. There are some options for the position at which the torque detecting apparatus 910 is arranged that detects the driving torque of the driving unit 110, but in the structure of FIG. 16, the torque sensor 113 corresponding to the encoder part of the torque detecting apparatus 910 is arranged between the wave motion gear apparatus 111 and the link 122.

The torque sensor 113 in FIG. 16 is formed of the elastic body 7 which is formed of the above described elastic inner ring 16 and the elastic outer ring 17 and functions as the body of the rotation, and the fixed member 6. The structure of this elastic body 7 is similar to that illustrated in FIG. 13 (Exemplary Embodiment 4), and the elastic inner ring 16 and the elastic outer ring 17 are connected to each other by a spoke-like elastic hinge 18 (unillustrated). The rotary axes 5 of the motor 112, the wave motion gear apparatus 111, the elastic body 7, and the link 122 are arranged so as to be aligned approximately on a straight line.

The scale 3 and the detecting head 1 (any of which is unillustrated in FIG. 16) are mounted on the elastic body 7 and the fixed member 6 which is arranged in the vicinity of the elastic body 7, respectively, so as to face each other, similarly as in the above description. In this case, the scale 3 and the detecting head 1 may be arranged as in Exemplary Embodiment 1 (FIG. 1A), or may also be arranged as in Exemplary Embodiment 3 (FIG. 12). Because of this, as for the scale 3 and the detecting head 1, the illustrations of the arranged positions and the orientations are omitted in FIG. 16.

The elastic outer ring 17 of the elastic body 7 is connected to the link 122 of the robot arm. The elastic inner ring 16 is connected rigidly to the output shaft of the wave motion gear apparatus 111. In addition, for instance, the disk-like fixed member 6 is connected rigidly and coaxially with the output shaft of the wave motion gear apparatus 111.

Due to the above structure, when the driving torque is applied to the elastic inner ring 16 of the elastic body 7 by the output shaft of the wave motion gear apparatus 111, the link 122 is rotationally driven through the elastic body outer ring 17. At this time, the elastic inner ring 16, the elastic hinge 18 (unillustrated) and the elastic outer ring 17 cause torsional deformation therein according to the reaction force of the driving torque, and relative (rotational) displacement occurs between the scale 3 mounted on the elastic body 7 and the detecting head 1 mounted on the fixed member 6.

The torque detecting apparatus 910 is structured, for instance, as is illustrated in FIG. 14, and can detect (reaction force of) the driving torque of the driving unit 110, through the relative (rotational) displacement between the scale 3 and the detecting head 1. The CPU 601 of the controlling apparatus 200 (FIG. 15B) can acquire the detected quantity of the driving torque which the torque detecting apparatus 910 outputs, through the interface 605. In addition, the CPU 601 can acquire also the detected quantities of the driving torques of the driving units 110 of the other joints J1, J2 and so on (or robot hand 102), similarly through the interface 605.

The CPU 601 of the controlling apparatus 200 can execute the robot control of controlling the operation for each of the units of the robot apparatus, while using the driving torque of (each) joint, which has been detected in the above described way. For instance, the CPU 601 can perform the torque (servo) control of feeding the driving torque which has been detected in (each) joint back for the driving quantity of the motor 112. Thereby, the CPU 601 can control the position and the orientation of each of the units in a desired state, while controlling the motors 112 which drives the joints J1, J2 and so on (or robot hand 102), respectively, with high precision.

By using the torque detecting apparatus 910 which uses the displacement detecting apparatus described in each of the above described exemplary embodiments, in the robot apparatus 500 in the present exemplary embodiment, the robot apparatus 500 can detect the torque of each of the joints in a wide range with high resolution, and can control the torque with high precision. In addition, even when such an event has occurred as to make the robot arm 101 collide (crash) against an obstacle, the torque detecting apparatus 910 can always detect the absolute value of the torque without needing the zero point adjustment including disassembly, calibration and the like of each of the units, as has been described above. Specifically, in the robot apparatus 500 of the present exemplary embodiment, even when the robot arm 101 has caused the crash, the torque sensor 113 of each of the joints always detects the absolute value of the torque, and does not miss the absolute value. Because of this, even when such an event as the crash of the robot arm 101 has occurred, the robot apparatus can be immediately operated again without performing the zero point adjustment and without needing the stop or disassembly of the robot arm, and can perform the robot control based on the torque control of high precision, similarly to the state before the event has occurred.

The structure of the displacement detecting apparatus described in each of the above described exemplary embodiments can be used not only for the above described torque detecting apparatus and robot arm, but also for detecting various fine rotational displacements in an angle measuring apparatus, a scanner shaft, the torsion measurement of a material, and the like. In addition, the torque detecting apparatus which uses the above described displacement detecting apparatus can be used not only for the above described robot apparatus, but also for detecting a torque of a driving unit in various apparatuses such as a conveying apparatus and a machine tool.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-077474, filed Apr. 6, 2015, and Japanese Patent Application No. 2016-021793, filed Feb. 8, 2016, which are hereby incorporated by reference herein in their entirety.

The invention claimed is:

1. A displacement detecting apparatus comprising:
a scale which has an optical pattern of a lattice arrangement;
a detecting head which has light-receiving elements, which detect the optical pattern of the scale; and a controlling apparatus which acquires a rotational displacement quantity of the scale with respect to the detecting head, based on a change of outputs of the detecting head, wherein the rotational displacement quantity of the scale with respect to the detecting head is determined using a first displacement quantity calculated based on a total light quantities that are output from the detecting head, and a second displacement quantity calculated based on an incremental displacement signal that is output from the detecting head.

2. The displacement detecting apparatus according to claim 1, wherein at least any one of a direction of the lattice arrangement of the optical pattern of the scale and a direction of the arrangement of the light-receiving elements of the detecting head is arranged so as to incline against a tangential direction to a direction of rotating the scale with respect to the detecting head.

3. The displacement detecting apparatus according to claim 2, wherein the optical pattern or the arrangement of the light-receiving elements is arranged to incline against the tangential direction to the direction of rotating the scale with respect to the detecting head so that two or more images of the optical pattern of the scale do not intersect with one light-receiving element of the light-receiving elements of the arrangement at the same time, on the light-receiving surface of the detecting head.

4. The displacement detecting apparatus according to claim 2, further comprising an adjusting unit which adjusts an inclination angle at which the direction of the lattice arrangement of the optical pattern or the arrangement of the light-receiving elements inclines against the tangential direction of the relative rotational displacement.

5. A torque detecting apparatus which detects a force of deforming an elastic body, by a displacement detecting apparatus, through a quantity of a rotational displacement of the elastic body against a fixed member arranged in the vicinity of the elastic body, which is formed by deformation of the elastic body, wherein the displacement detecting apparatus comprises:

a scale which has an optical pattern of a lattice arrangement;

a detecting head which has light-receiving elements, which detect the optical pattern of the scale; and a controlling apparatus which acquires a rotational displacement quantity of the scale with respect to the detecting head, based on a change of outputs of the detecting head, wherein the rotational displacement quantity of the scale with respect to the detecting head is determined using a first displacement quantity calculated based on a total light quantities that are output from the detecting head, and a second displacement quantity calculated based on an incremental displacement signal that is output from the detecting head, and wherein any one of the scale and the detecting head is fixed to the elastic body, the other is fixed to the fixed member so as to face any one of the scale and the detecting head fixed to the elastic body, and the torque detecting apparatus detects a force that is applied to the elastic body through the quantity of the rotational displacement between the scale and the detecting head, which the displacement detecting apparatus acquires.

6. A robot apparatus comprising:
a robot arm provided with a torque detecting apparatus at a joint or a driving unit of a robot hand;

a controlling unit configured to execute a robot controlling to control an operation of the robot arm, based on a driving torque of the driving unit detected by the torque detecting apparatus, wherein the torque detecting apparatus detects a force of deforming an elastic body, by a displacement detecting apparatus, through a quantity of a rotational displacement of the elastic body against a fixed member arranged in the vicinity of the elastic body, which is formed by deformation of the elastic body, wherein the displacement detecting apparatus comprises:

a scale which has an optical pattern of a lattice arrangement;

a detecting head which has light-receiving elements, which detect the optical pattern of the scale; and a controlling apparatus which acquires a rotational displacement quantity of the scale with respect to the detecting head, based on a change of outputs of the detecting head, wherein the rotational displacement quantity of the scale with respect to the detecting head is determined using a first displacement quantity calculated based on a total light quantities that are output from the detecting head, and a second displacement quantity calculated based on an incremental displacement signal that is output from the detecting head, and wherein any one of the scale and the detecting head is fixed to the elastic body, the other is fixed to the fixed member so as to face any one of the scale and the detecting head fixed to the elastic body, and the torque detecting apparatus detects a force that is applied to the elastic body through the rotational displacement quantity of the scale with respect to the detecting head, which the displacement detecting apparatus acquires.

7. A non-transitory computer readable recording medium storing a controlling program of a robot apparatus, the robot apparatus comprising:

a robot arm provided with a torque detecting apparatus at a joint or a driving unit of a robot hand; and a controlling unit configured to execute a robot controlling to control an operation of the robot arm, based on a driving torque of the driving unit detected by the torque detecting apparatus, wherein the torque detecting apparatus detects a force of deforming an elastic body, by a displacement detecting apparatus, through a quantity of a relative rotational displacement of the elastic body against a fixed member arranged in the vicinity of the elastic body, which is formed by deformation of the elastic body, wherein the displacement detecting apparatus comprises:

a scale which has an optical pattern of a lattice arrangement;

a detecting head which has light-receiving elements, which detect the optical pattern of the scale; and a controlling apparatus which acquires a rotational displacement quantity of the scale with respect to the detecting head, based on a change of outputs of the detecting head, wherein any one of the scale and the detecting head is fixed to the elastic body, the other is fixed to the fixed member so as to face any one of the scale and the detecting head fixed to the elastic body, and the torque detecting apparatus detects a force that is applied to the elastic body through the rotational displacement quantity of the scale with respect to the detecting head, the program comprising code to execute:

a first acquiring of acquiring by the controlling apparatus, a first displacement quantity calculated based on a total light quantities that are output from the detecting head;

a second acquiring of acquiring, by the controlling apparatus, a second displacement quantity calculated based on an incremental displacement signal that is output from the detecting head; and a displacement detecting, by the controlling apparatus, of using the first displacement quantity and the second displacement quantity, to acquire the rotational displacement quantity of the scale with respect to the detecting head.

8. A displacement detecting method, executed by a displacement detecting apparatus, the displacement detecting apparatus comprising:

a scale which has an optical pattern of a lattice arrangement;

a detecting head which has light-receiving elements, which detect the optical pattern of the scale; and a controlling apparatus which acquires a rotational displacement quantity of the scale with respect to the detecting head, based on a change of outputs of the detecting head, wherein the method comprises:

a first acquiring of acquiring by the controlling apparatus, a first displacement quantity calculated based on a total light quantities that are output from the detecting head;

a second acquiring of acquiring, by the controlling apparatus, a second displacement quantity calculated based on an incremental displacement signal that is output from the detecting head; and a displacement detecting, by the controlling apparatus, of using the first displacement quantity and the second displacement quantity, to acquire the rotational displacement quantity of the scale with respect to the detecting head.

9. The displacement detecting apparatus according to claim 1, wherein the first displacement quantity monotonically increases or decreases within a predetermined acquiring range.

10. The displacement detecting apparatus according to claim 1, wherein the first displacement quantity has a period longer than a period of the second displacement quantity.

11. A displacement detecting apparatus comprising:

a scale having an optical pattern of a lattice arrangement; and a detecting head having light-receiving elements which detect the optical pattern of the scale, wherein a direction of the lattice arrangement of the optical pattern of the scale is arranged so as to incline against a tangential direction to a direction of rotating the scale with respect to the detecting head, and wherein a direction of the arrangement of the light-receiving elements is arranged so as to be along the tangential direction to the direction of rotating the scale with respect to the detecting head.

12. The displacement detecting apparatus according to claim 11, further comprising a control apparatus, wherein the control apparatus acquires a first displacement quantity calculated based on a total light quantities that are output from the detecting head.

13. The displacement detecting apparatus according to claim 12, wherein the first displacement quantity monotonically increases or decreases within a predetermined acquiring range.

14. The displacement detecting apparatus according to claim 12, wherein:

the control apparatus acquires a second displacement quantity calculated based on an incremental displacement signal that is output from the detecting head, and the rotational displacement quantity of the scale with respect to the detecting head is acquired using the first displacement quantity and the second displacement quantity.

15. The displacement detecting apparatus according to claim 12, wherein the first displacement quantity has a period longer than a period of the second displacement quantity.

16. A displacement detecting apparatus comprising:

a scale having an optical pattern of a lattice arrangement; and a detecting head having light-receiving elements which detect the optical pattern of the scale, wherein a direction of the arrangement of the light-receiving elements is arranged so as to incline against a tangential direction to a direction of rotating the scale with respect to the detecting head, and wherein a direction of the lattice arrangement of the optical pattern of the scale is arranged so as to be along the tangential direction to the direction of rotating the scale with respect to the detecting head.

* * * * *